United States Patent
Niioka et al.

(10) Patent No.: US 8,884,944 B2
(45) Date of Patent: Nov. 11, 2014

(54) IMAGE DISPLAY DEVICE, DRIVING METHOD OF IMAGE DISPLAY DEVICE AND TERMINAL DEVICE

(75) Inventors: Shinya Niioka, Kanagawa (JP); Koji Shigemura, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 109 days.

(21) Appl. No.: 13/432,509

(22) Filed: Mar. 28, 2012

(65) Prior Publication Data
US 2013/0076723 A1  Mar. 28, 2013

(30) Foreign Application Priority Data
Mar. 28, 2011  (JP) .................................. 2011-069393

(51) Int. Cl.
| | |
|---|---|
| G06F 3/038 | (2013.01) |
| G09G 3/36 | (2006.01) |
| G09G 3/00 | (2006.01) |
| H04N 13/04 | (2006.01) |
| G02F 1/1362 | (2006.01) |
| G02B 27/22 | (2006.01) |

(52) U.S. Cl.
CPC ............ *G06F 3/038* (2013.01); *H04N 13/0404* (2013.01); *G09G 2300/0465* (2013.01); *G09G 3/3648* (2013.01); *G02F 1/136213* (2013.01); *G09G 3/003* (2013.01); *G02B 27/2214* (2013.01); *G02F 1/1362* (2013.01)
USPC .......................................................... 345/212

(58) Field of Classification Search
None
See application file for complete search history.

(56) References Cited

U.S. PATENT DOCUMENTS

| | | | |
|---|---|---|---|
| 2009/0160826 A1* | 6/2009 | Miller et al. .................. | 345/204 |
| 2009/0168167 A1* | 7/2009 | Hiroya et al. ................. | 359/477 |

FOREIGN PATENT DOCUMENTS

| | | |
|---|---|---|
| JP | 2005-208567 | 8/2005 |
| JP | 2009-098311 | 5/2009 |

OTHER PUBLICATIONS

Nikkei Electronics, No. 838, Nikkei Publishing, Jan. 6, 2003, pp. 26-27.

* cited by examiner

*Primary Examiner* — Joseph Feild
*Assistant Examiner* — Parul Gupta
(74) *Attorney, Agent, or Firm* — Young & Thompson

(57) ABSTRACT

A subpixel is provided with a pixel electrode 4PIX, a pixel thin-film transistor 4TFT, and a charging capacitor electrode CS2. The charging capacitor electrode CS2 is formed in the same layer as a charging capacitor line CS and electrically connected to the charging capacitor line CS. A charging capacitor 4CS is mainly formed between the charging capacitor electrode CS2 and an electrode constituted by a silicon layer 4SI via an insulating film. One of the source and drain electrodes of a pixel thin-film transistor TFT is connected to a data line D via a contact hole 4CONT1 and the other is connected to a pixel electrode 4PIX via a contact hole 4CONT2.

17 Claims, 30 Drawing Sheets

FIG.7
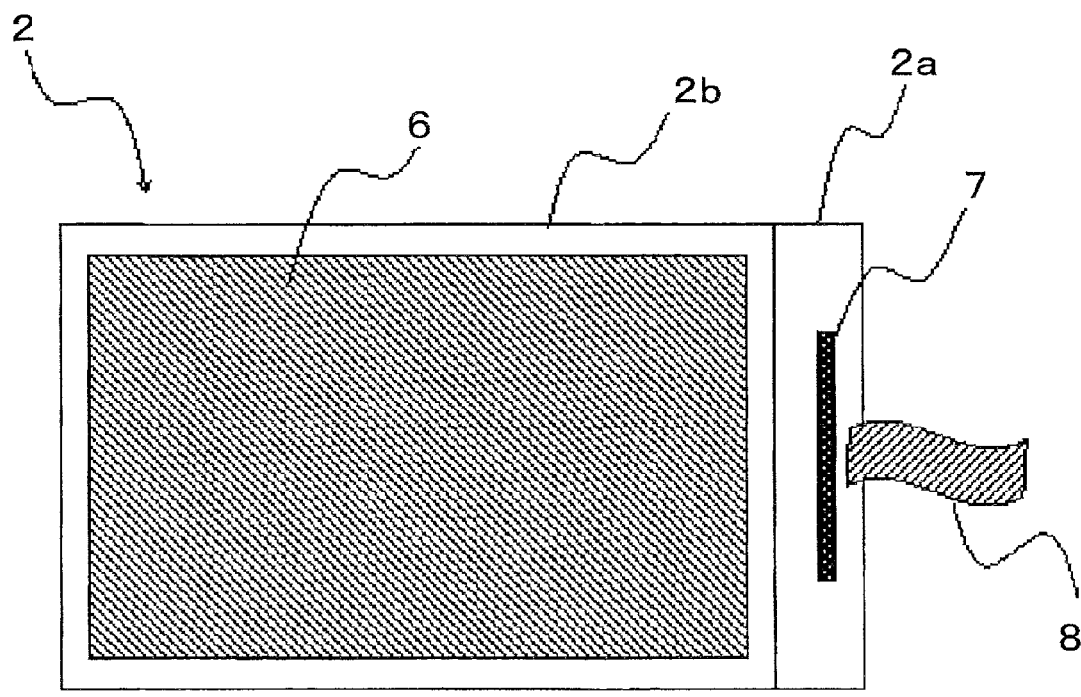
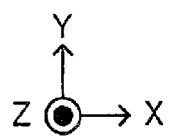

FIG.10

|     | G1 | G2 | G3 | G4 | G5 | G6 | G7 |
|-----|----|----|----|----|----|----|----|
| D1  | +  | −  | +  | −  | +  | −  | +  |
| D2  | −  | +  | −  | +  | −  | +  | −  |
| D3  | +  | −  | +  | −  | +  | −  | +  |
| D4  | −  | +  | −  | +  | −  | +  | −  |
| D5  | +  | −  | +  | −  | +  | −  | +  |
| D6  | −  | +  | −  | +  | −  | +  | −  |
| D7  | +  | −  | +  | −  | +  | −  | +  |
| D8  | −  | +  | −  | +  | −  | +  | −  |
| D9  | +  | −  | +  | −  | +  | −  | +  |
| D10 | −  | +  | −  | +  | −  | +  | −  |
| D11 | +  | −  | +  | −  | +  | −  | +  |
| D12 | −  | +  | −  | +  | −  | +  | −  |
| D13 | +  | −  | +  | −  | +  | −  | +  |

FIG.27

|     | G1 | G2 | G3 | G4 | G5 | G6 | G7 |
|-----|----|----|----|----|----|----|----|
| D1  | +  | −  | +  | −  | +  | −  | +  |
| D2  | −  | +  | −  | +  | −  | +  | −  |
| D3  | −  | +  | −  | +  | −  | +  | −  |
| D4  | +  | −  | +  | −  | +  | −  | +  |
| D5  | +  | −  | +  | −  | +  | −  | +  |
| D6  | −  | +  | −  | +  | −  | +  | −  |
| D7  | −  | +  | −  | +  | −  | +  | −  |
| D8  | +  | −  | +  | −  | +  | −  | +  |
| D9  | +  | −  | +  | −  | +  | −  | +  |
| D10 | −  | +  | −  | +  | −  | +  | −  |
| D11 | −  | +  | −  | +  | −  | +  | −  |
| D12 | +  | −  | +  | −  | +  | −  | +  |
| D13 | +  | −  | +  | −  | +  | −  | +  |

PRIOR ART

PRIOR ART

IMAGE DISPLAY DEVICE, DRIVING METHOD OF IMAGE DISPLAY DEVICE AND TERMINAL DEVICE

INCORPORATION BY REFERENCE

This application is based on Japanese Patent Application No. 2011-069393 filed on Mar. 28, 2011, and including specification, claims, drawings and summary. The disclosure of the above Japanese Patent Application is incorporated herein by reference in its entirety.

TECHNICAL FIELD

The present invention relates to an image display device, driving method of the image display device, and terminal device, and particularly to a device that displays images different from each other toward a plurality of view points, or a configuration of a display part for improving the display image quality.

BACKGROUND ART

Reduction in size of a display device and the accomplishment of high-definition display capability thereof are advanced together with the advancement of cellular phones and information terminals. On the other hand, a display device which has a new added value is getting attention, such as a display device that allows a viewer to view different images depending on a position from where the viewer watches the display device, i.e., a display device that provides images different from each other toward a plurality of view points, and a display device which produces a parallax image based on those images different from each other and which provides a stereoscopic image to the viewer.

A conventionally known scheme of providing images different from each other toward a plurality of view points synthesizes pieces of image data for respective view points, displays those pieces of image data on a display unit, separates the displayed synthesized images by an optical separating unit including a lens, a barrier (a light blocking plate) with slits, and provides images to respective view points. The principle of image separation is based on restriction of pixels viewable depending on a view-point direction using the optical unit, such as a barrier with slits or a lens. Examples of image separating units include a parallax barrier which is a barrier with multiple stripe-like slits, and a lenticular lens having cylindrical lenses which have a lens effect in a given direction.

A stereoscopic display device having an optical image separator is appropriate for mounting on a portable device since it does not need the use of a special eyeglass so that there is no burden of attaching the eyeglass. In practice, a portable device on which a stereoscopic display device including a liquid crystal panel and a parallax barrier is mounted is already available on the market (For example, "Nikkei Electronics, No. 838," Nikkei Publishing, Jan. 6, 2003, pp. 26-27; Non-Patent Literature 1, hereafter).

According to the above-explained scheme, i.e., the display device that provides images different from each other toward a plurality of view points using an optical separating unit, when the view-point position of a viewer moves and an image to be viewed is changed, a boundary between the image and another image appears to be darkened in some cases. This phenomenon originates from non-display regions (a light blocking unit, so-called a black matrix in general in the case of a liquid crystal panel) between a pixel and a pixel for view points being viewed. The above-explained phenomenon inherent to the movement of the view point of the viewer does not occur in the case of general display devices having no optical separating unit. Hence, the viewer may feel strangeness or reduction of the display quality from the above-explained phenomenon that occurs on a multi-view-point display device or a stereoscopic display device having the optical separating unit.

This phenomenon is called 3D moire in general. 3D moire is periodical varying of brightness (may be the varying of color in some cases) originating from different visions displayed on different angular directions. 3D moire is luminance angular fluctuation and does not become a problem depending on a view position. However, when fluctuation of brightness in the angular direction is large, 3D moire is supposed to have undesirable effect on stereoscopic viewing.

A display device which has respective shapes and layouts of the pixel electrodes and light blocking unit of the display unit devised in order to overcome the problem originating from the optical separating unit and the light blocking unit, and which suppresses a reduction of the display quality has been provided (for example, Unexamined Japanese Patent Application KOKAI Publication No. 2005-208567; Patent Literature 1, hereafter).

The Patent Literature 1 discloses a display device as shown in FIG. 29. The display device disclosed in the Patent Literature 1 has a substantially constant ratio between the light blocking portion (a wiring 1070 and the light blocking unit 1076) and the aperture in a cross section of the display element in the vertical direction 1011 orthogonal to the arrangement direction of the cylindrical lenses 1003*a* at any point in the horizontal direction 1012. Hence, when the viewer moves the view point in the horizontal direction 1012 that is the direction in which the images are separated, and the viewing direction changes, the ratio of the light blocking portion to be viewed is substantially constant. That is, the viewer does not occasionally view only the light blocking portion in a specific direction, and no display appears darkly. Accordingly, reduction in the display quality originating from a light blocking region can be suppressed.

Moreover, a pixel structure suitable for the display device of the Patent Literature 1 is disclosed (for example, Unexamined Japanese Patent Application KOKAI Publication No. 2009-98311; Patent Literature 2, hereafter).

The Patent Literature 2 discloses a liquid crystal display device comprising a pixel as shown in FIG. 30. The charging capacitor line CS is arranged in the extending direction of the gate line G, i.e., is connected to the charging capacitors 4CS of respective pixels adjoining to each other in the X axis direction. In respective pixels adjoining to each other in the X axis direction, positions of the pixel thin-film transistors in the Y axis direction differ from each other, so that the charging capacitor line CS is bent and arranged in order to connect those transistors. Like the pixel thin-film transistor, the charging capacitor 4CS is arranged at the upper-bottom side of a display region in a substantially trapezoidal shape in each pixel. Accordingly, the charging capacitor 4CS can be effectively arranged between upper-bottoms of respective pixels configuring an adjoining pixel pairs 4PAIR, thereby further improving the aperture ratio.

Moreover, in the liquid crystal display device disclosed in the Patent Literature 2, an intersection between the charging capacitor line CS and the data line D is arranged at a trapezoid inclining portion so that the charging capacitor line CS and the data line D are along with each other. It is preferable to reduce wirings arranged so as to be along the image separating direction as much as possible, and the above-explained display device has the data line D only. This further improves the image quality. This is because when the charging capacitor line CS is arranged in the Y axis direction, the image of the charging capacitor line CS is enlarged by the image separating unit, resulting in a remarkable deterioration of the display quality.

That is, the display device of the Patent Literature 2 has the gate line G and the charging capacitor line CS running in the image separating direction and formed on the same layer in order to suppress an image deterioration originating from the image separating unit and the charging capacitor line CS while reducing the number of processes.

Patent Literature 2 discloses a technique of forming a scanning line and a capacitor line through the same process in order to reduce the number of production processes. In particular, there is a large demand of cost reduction for general small display devices, and it is desirable to configure a pixel array with the number of layers as small as possible.

Moreover, there is a demand for the display unit of the display device to increase the so-called aperture ratio which is defined by the area ratio between the aperture contributing to the display brightness and the light blocking portion in order to make the pixel pitch finer so as to improve the high-definition display capacity and to improve the display brightness.

However, in order to accomplish the high-definition display of an image, it is necessary to arrange a large number of pixels in a screen region which is originally small, so that it is necessary to make the size of a pixel finer. That is, how to reduce the pixel size is a technical issue. However, pixels with a finer size are almost realized together with the advancement of the microfabrication of semiconductor technologies.

As explained above, there is a tendency that pixels become finer, but it is not always enabled to reduce the size of electrical and electronic circuits, such as a switching device and an auxiliary capacitor for driving the liquid crystal in order to modulate light in proportion to the refinement of the pixel. This is because the switching device and the auxiliary capacitor are formed on a substrate like a semiconductor substrate or a glass substrate through the microfabrication technique, but there is a limit for realizable line width due to the limit of the semiconductor process. Moreover, even if finer process is technically possible, it results in the cost increase for a time from the standpoint of plant investment.

Liquid crystal display devices have a problem that because of the above-explained limit together with refinement, a region where light is blocked increases, i.e., the aperture ratio decreases, and the light use efficiency of the whole display device decreases. There is a tradeoff relationship that when it is attempted to improve the image quality by refinement of the pixel, the light use efficiency decreases. Accordingly, there is a technical issue to realize a high-image-quality and highly efficient image display device and to realize a high-definition image simultaneously.

In particular, in the case of a small display device, because of the above-explained limit together with refinement, the ratio of wirings occupying the area of a pixel and that of a contact-hole area are extremely large, and the reduction of the aperture ratio is remarkable. It is necessary for the refined pixel to reduce the number of wirings in the pixel and that of the contact holes as much as possible.

Moreover, as disclosed in the Non-Patent Literature 1, recently, the applying field of the stereoscopic image display device and the application thereof become wide. As an example, a configuration in which image separation is performed in the direction in which the data line runs may be employed depending on the application of the display device.

However, the inventor of the present invention found out that the high aperture ratio and the high image quality cannot be accomplished even if the pixel structure disclosed in Patent Literature 2 is designed as the above-explained configuration while maintaining the aperture shape and the light-blocking shape of the pixel disclosed in Patent Literature 1.

What the inventor of the present invention found will be explained below in more detail. As explained above, since the direction in which the gate line runs and the image separating direction are consistent according to the conventional technologies, the running direction of the charging capacitor line formed on the same layer as that of the gate line can be drawn in the same direction as the image separating direction so as not to interfere with the image separating unit. Likewise, when the pixel structure disclosed in Patent Literature 2 is applied to a display device that separates images in a direction in which the data line runs, it is necessary to draw the charging capacitor line formed of the same material as that of the data line in the image separating direction.

In general, in order to protect the data line from any damage inherent to the process at the time of forming a switching device, the data line is often formed in a process step after the formation of the gate line, i.e., on the substrate, the data line is formed in a layer above the gate line. If the data line is formed in a layer above the gate line and the data line and charging capacitor line are formed in the same layer, the charging capacitor line has to form a charging capacitor between layers having a small relative electric permittivity per unit area, and then has to use a large area for forming a given charging capacitor. This results in an insufficient aperture ratio, and thus the transmissivity decreases.

Moreover, in the display device disclosed in Patent Literature 2, the charging capacitor 4CS can have a higher relative electric permittivity per unit area and, therefore, have the area reduced when it is formed between the silicon layer 4SI and the charging capacitor electrode in the same layer as the gate line G. In this case, however, it is necessary to newly provide a contact hole 4CONT that connects the charging capacitor electrode to the charging capacitor line CS, so that a sufficient pixel aperture ratio cannot be obtained, and thus the transmissivity decreases.

Moreover, according to the pixel structure of the display device disclosed in Patent Literature 2, the charging capacitor line CS on the same layer as that of the gate electrode is drawn so as to traverse the periphery of the switching device (TFT) in the image separating direction, so that the width in the Y axis direction of the light blocking portion located at the upper bottom of a trapezoid becomes one that is obtained by adding the line width of the charging capacitor line CS and the line drawing space to the area of the TFT. The width of the upper bottom of the substantially trapezoid in the Y axis direction cannot be reduced without the change in a process rule, so that the width of the light blocking portion in the Y axis direction covering the upper bottom of the substantially trapezoid becomes large relative to the width of the aperture region in the Y axis direction in the case of pixels with a narrow pitch. As a result, the aperture ratio drops. When the image of the light blocking portion covering the upper bottom of the substantially trapezoid is enlarged by the image separating unit, it is visually recognized as a darkened spot or stripe on the display unit by the viewer, and thus the display quality decreases.

In this specification, as explained above, the periodical varying of brightness (may be the varying of color in some cases), in particular, a luminance angular fluctuation originating from displaying of different images in different angular directions is defined as a "3D moire". Moreover, a mixing of an image for another view point and leaking of an image to an image for a given view point are defined as "3D crosstalk".

In general, a stripe pattern produced by an interference of structural objects having different periods is called a "moire stripe". The moire stripe is an interference stripe produced depending on the periodicity of the structural object and the pitch thereof, and the 3D moire is a brightness varying produced due to the imaging characteristic of the image separating unit. Accordingly, the 3D moire and the moire stripe are distinguished in this specification.

The 3D moire does not become a problem depending on a view position, but when the fluctuation in brightness in the angular direction is large, an undesirable effect for stereoscopic viewing may occur, so that it is desirable to set the brightness fluctuation to be equal to or smaller than a predetermined value.

SUMMARY

The present invention is invented in view of the above circumstances and an exemplary objective of the present invention is to provide an image display device, driving method of the image display device, and terminal device capable of realizing a high aperture ratio and uniform brightness and improving the image quality.

In order to achieve the above objective, the image display device according to a first exemplary aspect of the present invention comprises:

a display element comprising subpixels and on which multiple units of display including at least the subpixel displaying a first view point image and the subpixel displaying a second view point image are arranged in a matrix; and an optical distributer for distributing light emitted from the first view point subpixel and second view point subpixel in a first direction, wherein the optical distributer has an optical axis parallel to a second direction orthogonal to the first direction;

the subpixels each comprise a switcher for transferring display signals for displaying images, and a charging capacitor electrode forming capacitance;

the display element comprises data lines extended in the first direction and supplying the display signals, gate lines extended in the second direction and controlling the switcher, and charging capacitor lines extended in the second direction and electrically connecting the charging capacitor electrodes in the second direction; the switcher of one of a pair of subpixels facing each other via one of the data lines is connected to the data line and gate line;

the switcher of the other of the pair of subpixel is connected to the same data line as the one of the pair of subpixel and a different one of the gate lines from the one of the pair of subpixel;

the charging capacitor electrode and an electrode of the switcher of each subpixel of the pair of subpixels are electrically equally connected;

at least one portion of the gate lines is inclined to cross the optical axis in a direction different from said second direction; and at least one portion of the charging capacitor lines is provided along the gate lines.

The image display device according to a second exemplary aspect of the present invention is a method of driving the image display device according to the above first exemplary aspect, wherein the gate lines are scanned every other line, the polarity of voltage of pixels is inverted on the basis of every other gate line, and the polarity of the display signals transferred is inverted on the basis of every other data line.

The terminal device according to a third exemplary aspect of the present invention comprises the image display device according to the above first exemplary aspect.

The present invention can realize a high aperture ratio and uniform brightness and improve the image quality.

BRIEF DESCRIPTION OF THE DRAWINGS

These objectives and other objectives and advantages of the present invention will become more apparent upon reading the following detailed description and the accompanying drawings in which:

FIG. 7 is a plane view showing the display element according to the first exemplary embodiment of the present invention;

FIG. 10 is a table showing the polarity of dot inversion driving input into a data line in the image display device according to the first exemplary embodiment of the present invention;

FIG. 27 is a table showing the polarity of dot inversion driving input into a data line in the image display device according to the fourth exemplary embodiment of the present invention;

EXEMPLARY EMBODIMENTS

Image display devices according to the exemplary embodiments of the present invention will be explained in detail with reference to the accompanying drawings.

First Exemplary Embodiment

First, an explanation will be given of an image display device, a display element of the image display device, and a driving method thereof according to a first exemplary embodiment of the present invention.

Figure 1:
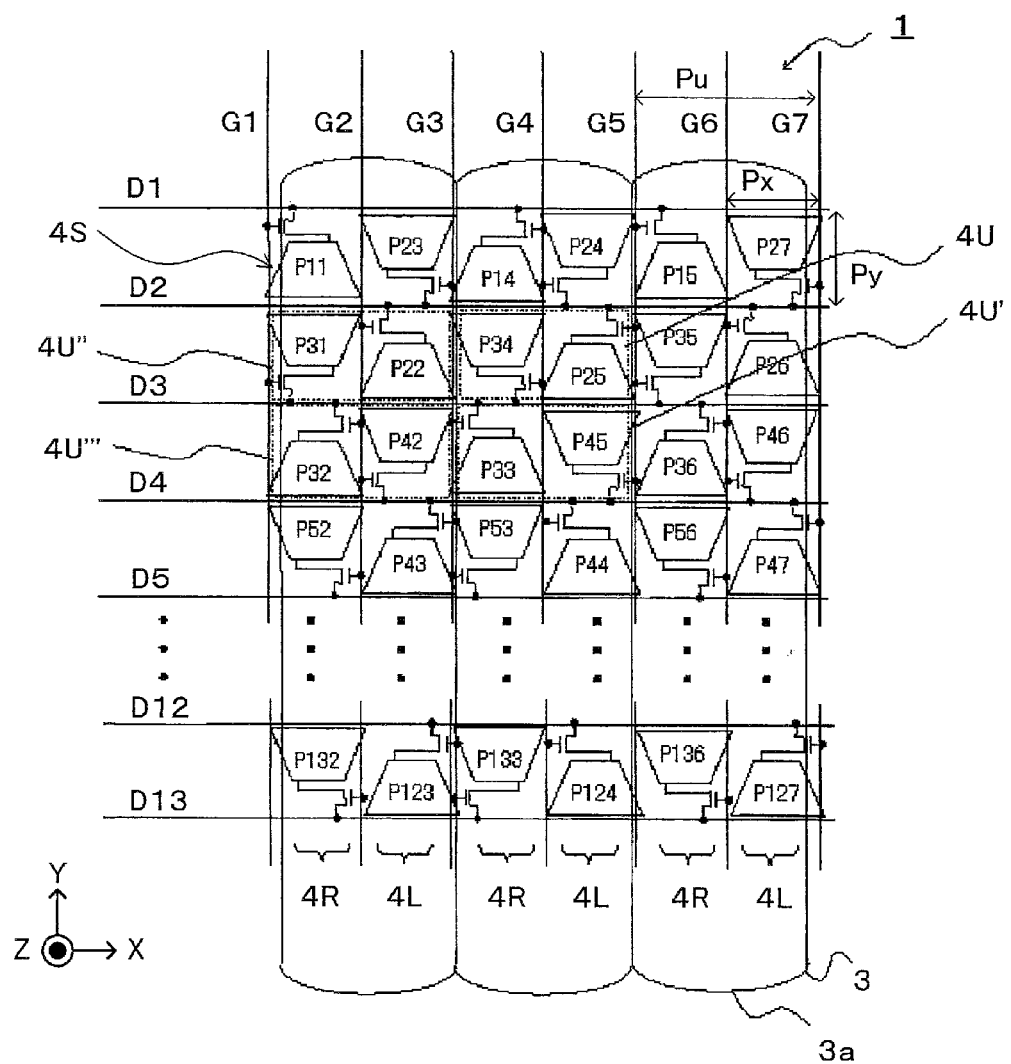
FIG. 1 is a plan view of an image display device according to a first exemplary embodiment of the present invention.
Figure 2:
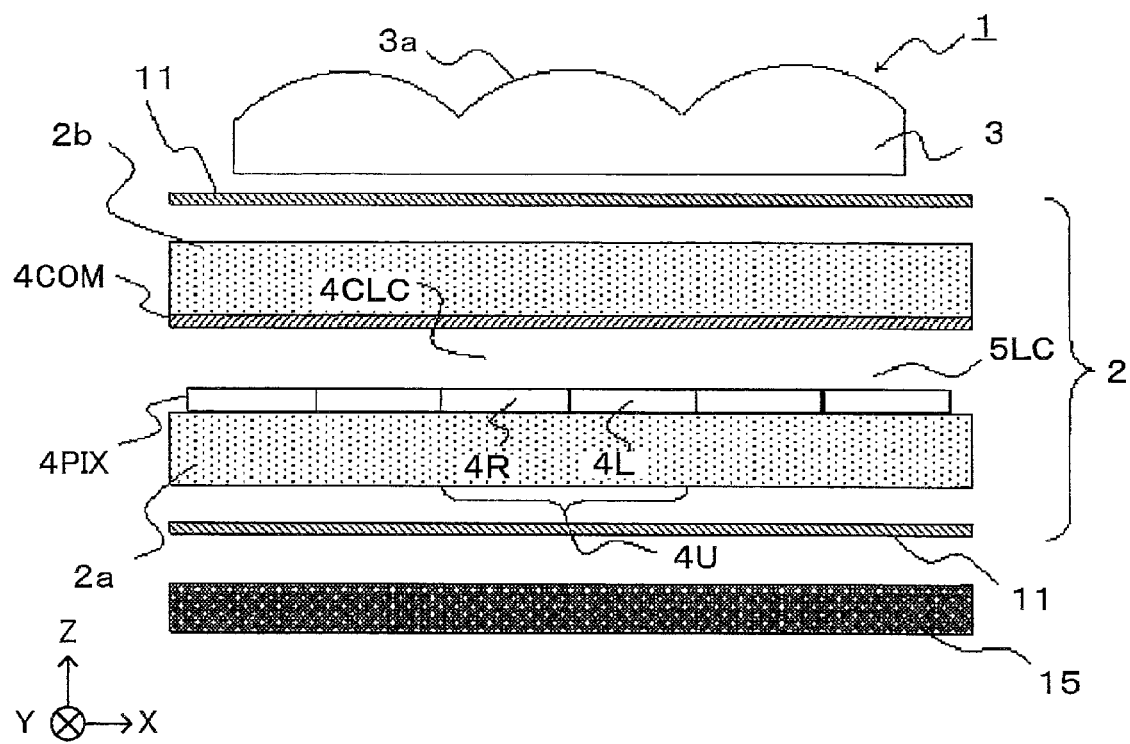
FIG. 2 is a cross-sectional view of the image display device according to the first exemplary embodiment of the present invention.

As shown in FIGS. 1 and 2, an image display device 1 according to the present exemplary embodiment is composed of a display element 2, a lenticular lens 3, and a backlight 15. The display element 2 is a liquid crystal panel using liquid crystal molecules as the electro-optic element. The lenticular lens 3 is provided on the display surface side of the display element 2, namely the side closest to the user. The backlight 15 is placed on the back of the display element 2.

Figure 3:
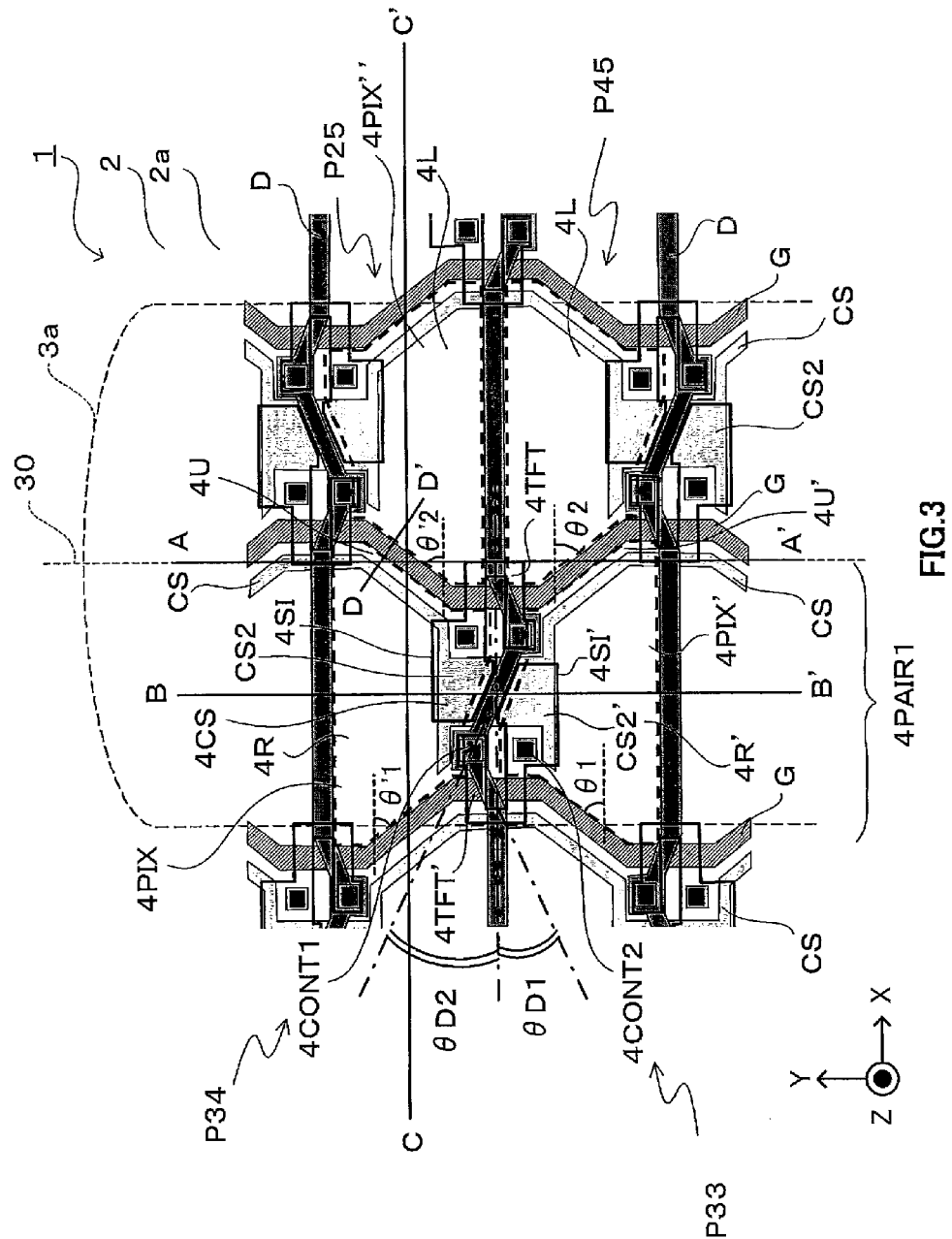
FIG. 3 is a plan view showing a subpixel of the image display device according to the first exemplary embodiment of the present invention.
Figure 4:
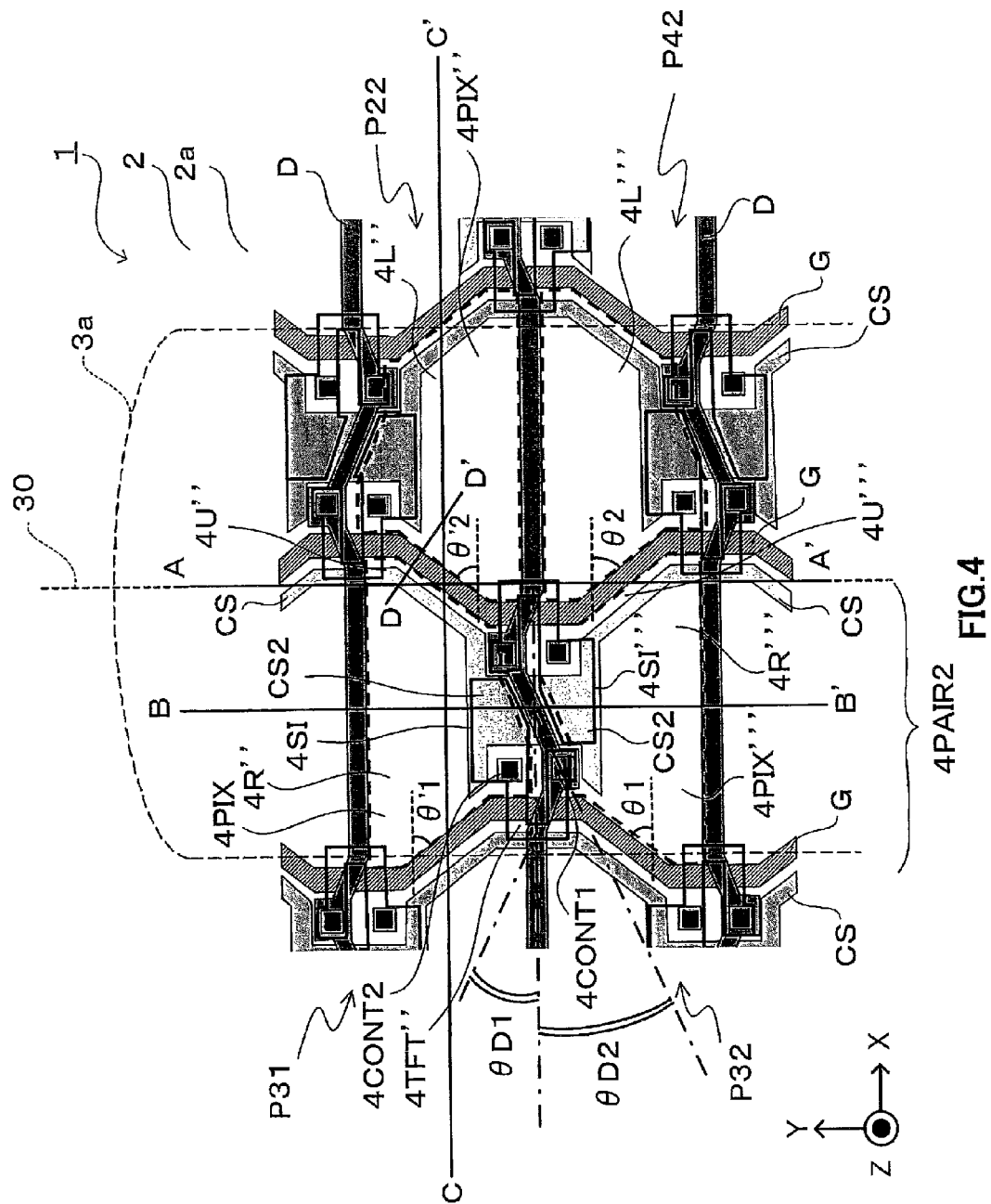
FIG. 4 is a plan view showing a subpixel of the image display device according to the first exemplary embodiment of the present invention.

As shown in FIG. 1, units of display 4U, 4U', 4U'', and 4U''' are arranged in a matrix in the display part of the display element 2. The unit of display 4U consists of a left-eye pixel 4L and a right-eye pixel 4R and so do the units of display 4U', 4U'', and 4U'''. In other words, the display element 2 is a liquid crystal panel comprising subpixels displaying a left-eye image and subpixels displaying a right-eye image for stereoscopic display from two view points. In the following explanation, a pixel constituting a unit of display 4U, 4U', 4U'', or 4U''' is referred to as "a subpixel" without distinction between the left-eye and right-eye pixels 4L and 4R. In other words, it can be said that a unit of display 4U consists of two subpixels 4S adjacent to each other. As shown in FIGS. 3 and 4, the units of display 4U, 4U', 4U'', and 4U''' are different in layout on the TFT substrate 2a; however, they all comprise a left-eye pixel 4L and a right-eye pixel 4R. Therefore, they are collectively referred to as "a unit of display 4U" for explaining the common structure. Furthermore, in the following explanation, "the display part" refers to the entire screen region of the display element 2 and "the display region" refers to the aperture of a subpixel 4S.

The lenticular lens 3 shown in FIG. 2 is a lens array having multiple cylindrical lenses 3a arranged in a one-dimensional alignment manner. The cylindrical lens 3a is a one-dimensional lens having a convex portion in a horseshoe shape. The direction in which cylindrical lens 3a extends, i.e., the lengthwise direction is orthogonal to the arrangement direction in a display surface. The cylindrical lens 3a has no lens effect in the extending direction, but has the lens effect only in the arrangement direction that is the orthogonal direction. Hence, the lenticular lens 3 can serve as a one-dimensional lens array that has the lens effect only in the direction in which the cylindrical lenses 3a are arranged. The arrangement direction of the cylindrical lenses 3a is set to be a direction in which the left-eye pixels 4L and the right-eye pixels 4R are alternately arranged. The cylindrical lenses 3a are each disposed so as to correspond to the above-explained unit of display 4U.

As explained above, the cylindrical lens 3a has the lens effect only in the direction orthogonal to the extending direction. In the present exemplary embodiment, the direction in which the lens effect acts is consistent with the direction in which the left-eye pixels 4L and the right-eye pixels 4R are alternately arranged. As a result, the cylindrical lenses 3a function as light beam separating unit which is capable of separating light from the left-eye pixel 4L and light from the right-eye pixel 4R in different directions. Accordingly, the lenticular lens 3 can separate an image displayed by the left-eye pixel 4L for each unit of display and an image displayed by the right-eye pixel 4R for each unit of display in different directions. That is, the lenticular lens 3 is an optical member that functions as image separating unit and image distributing unit. The focal distance of the cylindrical lens 3a is set to be a distance between the principal point of the cylindrical lens 3a, i.e., the vertex of the lens and a pixel surface, i.e., a surface where the left-eye pixel 4L or the right-eye pixel 4R is arranged.

In the following explanation, an X, Y, and Z Cartesian coordinate system is defined as below for convenience. In the direction in which the left-eye pixels 4L and the right-eye pixels 4R are alternately arranged, a direction from the right-eye pixel 4R to the left-eye pixel 4L is defined as +X direction, and the opposite direction thereof is defined as −X direction. The +X direction and the −X direction are collectively referred to as an X axis direction. Moreover, the lengthwise direction of the cylindrical lens 3a is defined as a Y axis direction. Furthermore, the direction orthogonal to both X axis direction and Y axis direction is defined as a Z axis direction, and in the Z axis direction, a direction from the surface where the left-eye pixel 4L or the right-eye pixel 4R is arranged to the lenticular lens 3 is defined as +Z direction, and the opposite direction thereof is defined as −Z direction. The +Z direction is directed ahead, i.e., toward a user, and the user views the surface of the display element 2 at +Z side. The +Y direction is a direction in which the right-hand coordinate system is established. That is, when the thumb of a right hand of a human is directed to the +X direction and the index finger is directed to the +Y direction, the middle finger is directed to the +Z direction. In the figures, the point of origin with a symbol x indicates that the direction from the front to back of the sheet is the positive direction and the point of origin with a filled circle indicates that the direction from the back to front of the sheet is the positive direction.

When the X, Y, and Z Cartesian coordinate system is defined as explained above, the arrangement direction of the cylindrical lenses 3a is the X axis direction, and an image for the left eye and an image for the right eye are separated along the X axis direction. Moreover, units of display 4U each including the left-eye pixel 4L and the right-eye pixel 4R are arranged on a line in the Y axis direction. The arrangement cycle of the units of display 4U in the X axis direction is substantially equal to the arrangement cycle of the cylindrical lenses 3a. A cylindrical lens 3a corresponds to a line where the units of display 4U are arranged in the Y axis direction.

Figure 11:
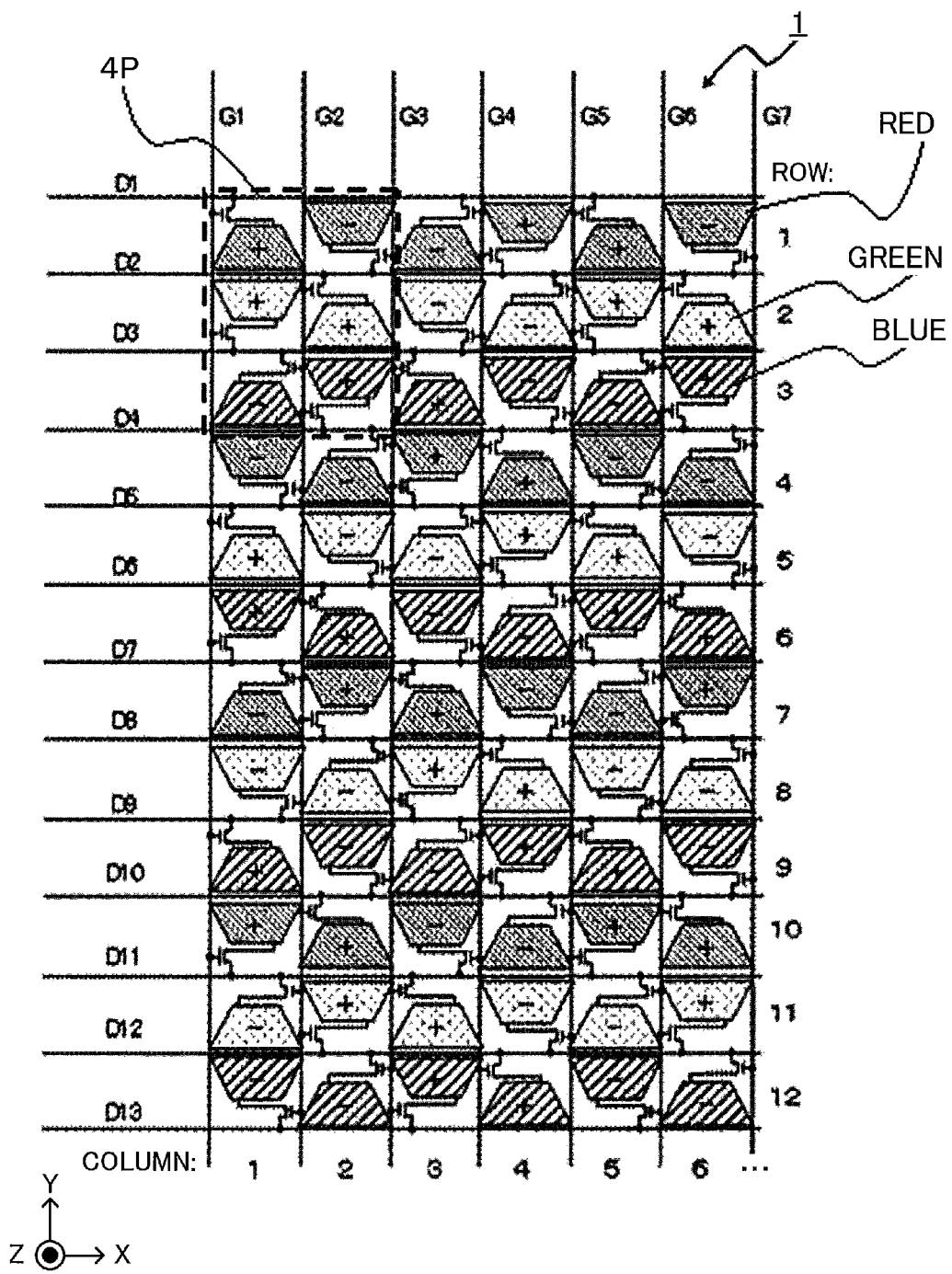
FIG. 11 is a schematic illustration showing the polarity of subpixels of the image display device according to the first exemplary embodiment of the present invention.

As shown in FIG. 11, in the present exemplary embodiment, a pixel 4P is defined by three units of display 4U arranged in the Y axis direction, and each unit of display 4U is colored in red, green, or blue. Color filters of respective colors: red; green; and blue extend in the X axis direction, and red, green, and blue color filters are repeatedly arranged in a stripe-like pattern in the Y axis direction. The order of colors of the color filter is not limited to this configuration. Moreover, the kinds of colors are not limited to this configuration, and color filters with M number of colors equal to or larger than three colors may be repeatedly arranged in a stripe-like pattern. In the present exemplary embodiment, the color filters and a black matrix are provided on the surface of an opposing substrate 2b at a liquid-crystal-layer-5LC side.

As shown in FIG. 2, the display element 2 has a TFT substrate 2a and the opposing substrate 2b arranged so as to have a tiny space therebetween, and the liquid crystal layer 5LC is arranged in that space. The liquid crystal layer 5LC is set to be in, for example, a transparent TN mode. The present invention is not limited to this configuration, and other liquid crystal modes can be applied. The TFT substrate 2a is arranged at the −Z direction side of the display element 2, and the opposing substrate 2b is arranged at the +Z direction side. That is, the lenticular lens 3 is arranged at the further +Z side of the opposing substrate 2b. Moreover, polarization plates 11 are pasted at the +Z side of the TFT substrate 2a and at −Z side of the opposing substrate 2b.

The display element 2 is an active-matrix liquid crystal display panel including TFTs (Thin Film Transistors). The TFT functions as a switch that supplies a display signal to each subpixel, and a gate signal that flows through a gate line G connected to the gate of each switch controls the switch. In the present exemplary embodiment, gate lines G1 to G7 that run in the column direction (the Y axis direction) are arranged on a surface of the TFT substrate 2a at the liquid-crystal-layer-5LC side (a surface at the +Z direction side). Hereinafter, the gate lines G1 to G7 are collectively referred to as a gate line G. Furthermore, data lines D1 to D13 that run in the row direction (the X axis direction) are arranged on the same surface of the TFT substrate 2a. Hereinafter, the data lines D1 to D13 are collectively referred to as a data line D. Here, the data line D serves to supply display data signals to the thin-film transistors.

In the present exemplary embodiment, the gate lines G are bent but run in the Y axis direction through several bendings, and arranged in the X axis direction. Moreover, the data lines D are bent but run in the X axis direction through several bendings, and are arranged in the Y axis direction. A subpixel 4S (the left-eye pixel 4L or the right-eye pixel 4R) is arranged in the vicinity of the intersection between the gate line G and the data line D.

Particularly, in FIG. 1, in order to clarify the connection relationship of each subpixel 4S to the gate line G and the data line D, for example, a subpixel 4S connected to the data line D3 and the gate line G2 is denoted as P32. That is, the number following a letter P is the number of the data line D, and the number following the former number is the number of the gate line G.

As shown in FIGS. 3 and 4, a pixel electrode 4PIX, a pixel thin-film transistor 4TFT, and a charging capacitor electrode CS2 are provided in a subpixel 4S. The charging capacitor electrode CS2 is formed in the same layer as the charging capacitor line CS and electrically connected to the charging capacitor line CS. The charging capacitor 4CS is mainly formed between the charging capacitor electrode CS2 and an electrode consisting of a silicon layer 4SI via an insulating film. Here, the silicon layer 4SI is formed in the same layer as the silicon layer of the thin-film transistor 4TFT. The pixel thin-film transistor 4TFT is a MOS thin-film transistor, has either one of the source electrode or the drain electrode connected to the data line D through a contact hole 4CONT1, and has another connected to the pixel electrode 4PIX through the contact hole 4CONT2. Therefore, the pixel electrode 4PIX is electrically connected to the electrode consisting of the silicon layer 4SI and has the same potential. In the present exemplary embodiment, the electrode connected to the pixel electrode 4PIX is referred to as a source electrode, and the electrode connected to a signal line is referred to as a drain electrode. The gate electrode of the pixel thin-film transistor 4TFT is connected to the gate line G. Furthermore, an opposing electrode 4COM is formed on the opposing substrate at the liquid-crystal-layer-5LC side, and a pixel capacitor 4CLC is formed between the opposing electrode 4COM and the pixel electrode 4PIX.

In FIGS. 3 and 4, respective contours of the contact hole CONT1, the contact hole CONT2, the pixel electrode 4PIX, and a silicon layer 4SI are indicated by a gray color, a black color, a dashed line, and a thick line, respectively.

In FIG. 1, in order to clarify the connection relationship of each subpixel 4S to the gate line G and the data line D, the pixel thin-film transistor 4TFT and the pixel electrode 4PIX shown in FIG. 3 are extracted and shown. In FIGS. 3 and 4, the respective sizes and scales of structural elements are changed appropriately in order to maintain the visibility of the figure.

As shown in FIG. 1, in this specification, the region enclosed by adjacent gate lines G and data lines D forms a pixel region corresponding to a subpixel 4S. An aperture is formed in such a subpixel 4S.

A pixel consists of three units of display 4U arranged in the Y axis direction and is a square having subpixels 4S three columns by two rows. When, the pitch of subpixels 4S in the X axis direction is Px, and the pitch of subpixel 4S in the Y axis direction is Py, the pitch of pixels, Pu, is 3×Py or 2×Px, and the following relational expression is satisfied.

$$Pu = 2 \times Px = 3 \times Py \qquad \text{[Math 1]}$$

Figure 5:
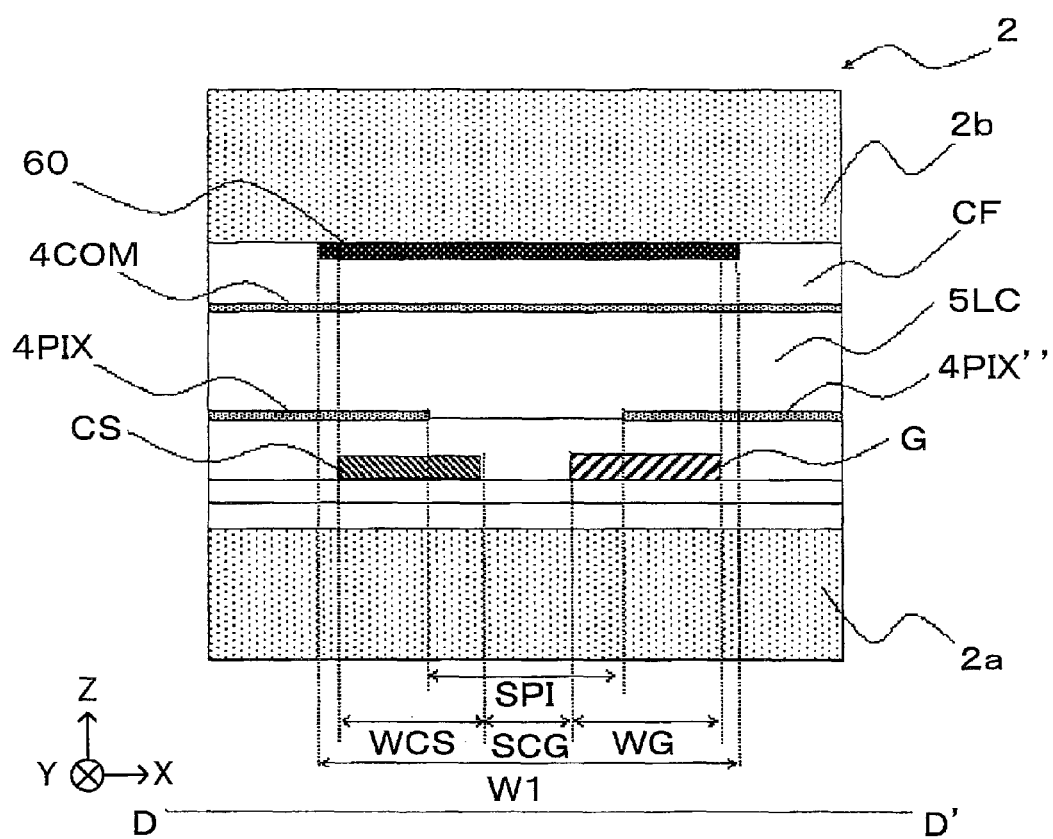
FIG. 5 is a cross-sectional view showing the inclined wiring in a subpixel according to the first exemplary embodiment of the present invention.
Figure 6:
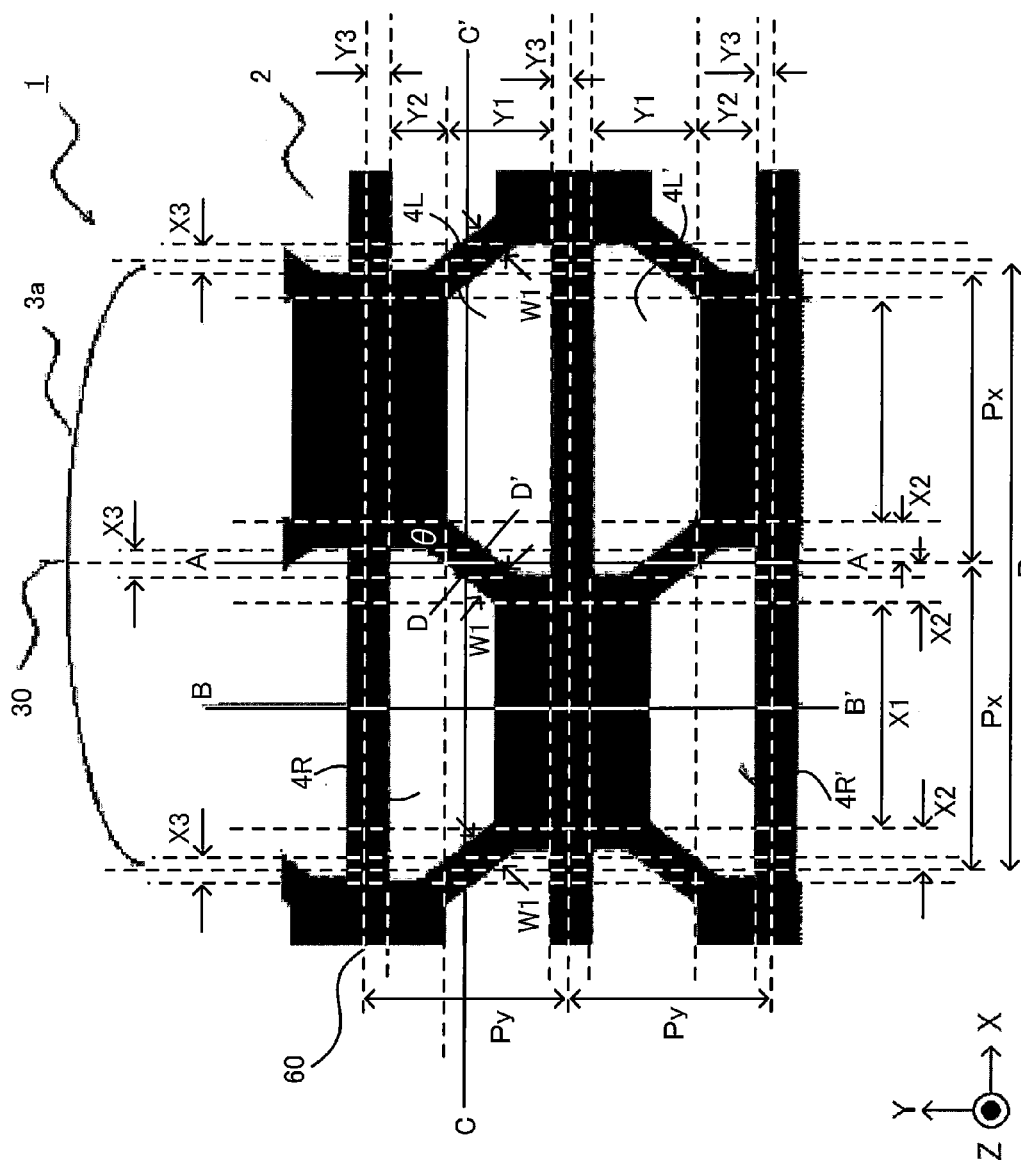
FIG. 6 is a plan view showing the black matrix of the image display device according to the first exemplary embodiment of the present invention.

As shown in FIG. 5, the black matrixes 60 is provided on the opposing substrate 2b at the liquid-crystal-layer-5LC side as a light blocking portion covering all but the apertures of subpixels 4S. Moreover, as shown in FIG. 6, the black matrix 60 covers the pixel thin-film transistor 4TFT, the gate line G, and the data line D, and is opened in substantially trapezoidal shape. In the present exemplary embodiment, the region other than the light blocking portion is defined as the aperture. In other words, the region where the black matrix 60 is absent is the aperture. Moreover, in the present exemplary embodiment, a term "light blocking portion" is used, but this is not particularly limited to the black matrix 60, and is a portion which blocks off light. Hence, the black matrix 60 may not be provided on the data line D or the gate line G, and may cover only pixel thin-film transistor 4TFT and charging capacitor electrode CS2. In this case, the data line D and the gate line G serve as the light blocking portion.

When expressions "up" and "down" or "low" on an XY plane are used in this specification, an "up" or "down" direction is a parallel direction to the Y axis direction, and the "up" side is the +Y direction, and the "down" or "low" side is the −Y direction. As explained above, the subpixel 4S can be regarded as being in a trapezoidal shape because of the shape of the light blocking portion, so that in the following explanation, such subpixel is referred to as a substantially trapezoidal pixel, and the longer side is defined as a lower bottom, and the shorter side is defined as an upper bottom. The shape of the aperture is not limited to the trapezoidal shape, and can be a parallelogram, a polygon, an ellipse, a semicircle, etc.

As shown in FIG. 6, the length of the upper bottom in the aperture of the substantially trapezoidal pixel is indicated by a reference symbol X1. Moreover, the length of the inclined side of the substantially trapezoidal pixel from the center of the light blocking portion to an intersection with the upper bottom of the substantially trapezoidal pixel in the X axis direction is indicated by a reference symbol X2. Then, the width in the X direction of the substantially trapezoidal pixel in the inclined-side region is 2×X2. Moreover, in an adjoining subpixel in the X axis direction, the width of a region where respective apertures of the substantially trapezoidal pixels overlap each other in the X axis direction is indicated by a reference symbol X3. Furthermore, the aperture width of the aperture of the substantially trapezoidal pixel is indicated by a reference symbol Y1. The width in the Y direction of the light blocking portion at the upper bottom of the substantially trapezoidal pixel is Y2, and the width in the Y direction of the light blocking line arranged at the lower bottom of the substantially trapezoidal pixel is 2×Y3. Accordingly, based on the pitch Px of the subpixel 4S in the X axis direction, the pitch Py in the Y axis direction, and the relationship between the light blocking portion of the substantially trapezoidal pixel and the aperture, the following relational expression is satisfied.

$$Px = X1 + 2 \times X2 \quad \text{[Math 2]}$$

$$Py = Y1 + Y2 + 2 \times Y3 \quad \text{[Math 3]}$$

The pixel thin-film transistor 4TFT shown in FIGS. 3 and 4 is a poly-silicon thin-film transistor using polycrystal silicon as a semiconductor. An example of the polycrystal silicon is a p-type semiconductor containing a tiny amount of boron. That is, the pixel thin-film transistor 4TFT is a PMOS thin-film transistor which the source electrode and the drain electrode electrically conducted when the potential of the gate electrode becomes low level relative to the potential of the source electrode or the drain electrode.

The poly-silicon thin film is formed by, for example, forming a silicon oxide layer on the TFT substrate 2a, of forming an amorphous silicon layer thereon, and of causing the amorphous silicon layer to be polycrystalline. Example techniques of causing the amorphous silicon layer to be polycrystalline are thermal annealing and laser annealing. In particular, in the case of the laser annealing using laser like an excimer laser, it is possible to heat only the silicon layer and to cause such silicon layer to be polycrystalline while limiting the temperature rise of a glass substrate at a minimum. Accordingly, when the laser annealing is applied, it becomes possible to use an alkali-free glass having a low melting point. Hence, the cost can be reduced, so that the poly-silicon thin-film transistor is widely used and called a low-temperature poly-silicon. An amorphous silicon thin-film transistor can be realized by skipping an annealing step.

Next, a silicon oxide layer that will be a gate insulation layer is formed on the poly-silicon layer, and is patterned as needed. In this process, it is preferable to dope ions in regions other than the portion to be used as the semiconductor layer of the silicon thin-film in order to make such regions conductive. This process can also be used to form the silicon layer 4SI. An example scheme of patterning is optical patterning that uses a photosensitive resist. In an example case, after the photosensitive resist is subjected to spin coating, light is partially emitted from an exposure device like a stepper, and the film of photosensitive resist is left on only portion where a pattern should be formed through a developing process. Thereafter, the silicon layer at the region where no photosensitive resist film is left is eliminated by dry etching, etc., and the photosensitive resist film is peeled off last.

Next, an amorphous silicon layer and a tungsten silicide layer are formed, and those layers are patterned in order to form a gate electrode, etc. At this time, it is fine if a gate line to be connected to the gate electrode, a charging capacitor electrode, and a charging capacitor line are formed simultaneously. Next, a silicon oxide layer and a nitride silicon layer are formed and patterned as needed, and an aluminum layer and a titanium layer are formed in order to form a source electrode and a drain electrode. At this time, it is fine if a data line is formed simultaneously.

Next, a nitride silicon layer is formed and is patterned as needed, and a transparent conductive film like ITO (Indium Tin Oxide) is formed and patterned, thereby forming a pixel electrode. Through those processes, a pixel structure with a thin-film transistor can be formed. A circuit that drives the gate line, the data line, and the charging capacitor line can be formed simultaneously using this thin-film transistor.

The display element 2 is, as shown in FIG. 7, a display panel designed for landscape display (a wide screen) with the long side oriented in the X axis direction and the short side oriented in the Y axis direction. In an example, the display element 2 has a screen resolution WVGA and 800 pixels in the X axis direction and 480 pixels in the Y axis direction. As explained above, a unit of display 4U consists of two subpixels corresponding to two view points. One pixel consists of three units of display 4U and the units of display 4U are colored in three colors. In such a case, the numbers of data lines and gate lines used in the display unit 6 are as follows: the number of data lines arranged in the Y axis direction is 480×3=1440 and the number of gate lines arranged in the X axis direction is 800×2=1600. Therefore, the display element 2 shown in FIG. 7 has the data lines less than the gate lines.

Moreover, a driver IC7 for controlling video signals is mounted on the TFT substrate 2a of the display element 2 at a short side. The output of the driver IC 7 is connected to the data lines of the display unit 6. Generally, the output pin pitch of the driver IC 7 is smaller than the data line pitch. Therefore, the wires extending from the output pins of the driver IC 7 to the data lines must be spread and, therefore, a given distance from the display unit 6 is necessary. The distance between the display unit 6 and driver IC 7 can be reduced as the number of data lines to make connection is lower for the same output pin pitch. In the case of the display unit 6 being used in the landscape mode, the number of data lines can be reduced when the data lines extends horizontally, namely to a short side in the X axis direction compared with when the data lines extends vertically to a long side. Then, the data lines extending horizontally allows for a smaller frame. Moreover, a smaller number of data lines can reduce the necessary driver IC 7 in number, reduce the cost, and reduce the workload of the driver IC 7. Moreover, a multiplexer circuit for data signals can be installed in the driver IC 7 and a switching circuit sorting data signals output from the driver IC 7 in a time-sharing manner according to the operation of the multiplexer circuit can be provided on the TFT substrate 2a. In this way, the number of data signal wires output from the driver IC 7 to be connected can further be reduced.

In the present exemplary embodiment, a gate driver circuit that successively scans the gate lines is formed on the TFT substrate 2a simultaneously with the pixel thin-film transistor. Accordingly, the frame width of the display element 2 at the long side can be reduced. By arranging the driver IC 7 at the short side and by integrating the gate driver circuit at the long side, respective sides of the frame of the display element 2 can be reduced. Furthermore, by reducing the size of the frame, the size of the display element 2 can be reduced. Accordingly, the number of display elements 2 obtained from a mother substrate is increased, thereby reducing the cost. Still further, by integrally forming the subpixel and the gate driver circuit on the TFT substrate 2a, the number of parts of the driver circuit can be reduced, resulting in a cost reduction and little energy consumption.

The screen resolution is not confined to the above configuration. Accordingly, if a display element 2 for N view points in which one pixel is colored in K colors has a screen resolution of Mx pixels arranged in the X axis direction and My pixels arranged in the Y axis direction, such a display element 2 can yield the above effects provided that the relationship N×Mx<K×My is satisfied.

In the present exemplary embodiment, as shown in FIG. 3, the gate lines G, the charging capacitor lines CS, and the charging capacitor electrodes CS2 are formed on the same layer as that of the gate electrode of the pixel thin-film transistor 4TFT. Moreover, the charging capacitors 4CS are formed between the silicon layer 4SI and the charging capacitor electrodes CS2. As explained above, the silicon layer 4SI is connected to the data line D through the contact hole 4CONT1, and another contact hole 4CONT2 in the subpixel 4S provided at the pixel-electrode 4PIX side is for electrically connecting the silicon layer 4SI in the charging capacitor 4CS and the pixel electrode 4PIX.

In the present exemplary embodiment, an expression "adjoining pixel pair" is used. This means that two subpixels situated on either side of a data line D are connected to that data line D between these subpixels. That is, a data potential of a video signal is supplied to the pixels configuring the adjoining pixel pair through the data line D arranged therebetween. For example, as shown in FIG. 3, the two subpixels 4S arranged side by side in the left of the Y axis direction configure an adjoining pixel pair 4PAIR, Moreover, as shown in FIG. 4, the two subpixels 4S arranged side by side in the left of the Y axis direction configure an adjoining pixel pair 4PAIR2. For explaining the common structure, the adjoining pixel pairs 4PAIR1 and 4PAIR2 will collectively be referred to as 4PAIR hereafter.

Respective subpixels configuring the adjoining pixel pair 4PAIR are controlled to perform a switching operation through different gate lines G. In the adjoining pixel pair 4PAIR on the left in FIG. 3, the subpixel 4S at the −Y direction side is controlled by the gate line G arranged at −X direction side, and the subpixel 4S at the +Y direction side is controlled by the gate line G arranged at +X direction side.

In FIG. 3, the two subpixels 4S of an adjoining pixel pair 4PAIR adjoining in the direction in which the data line D runs, i.e., the X axis direction are not connected to the common data line D, but are connected to different data lines D. This is because the adjoining pixel pair 4PAIR adjoins in the X axis direction in a state in which subpixels 4S are shifted by one pixel in the Y axis direction. Such an arrangement enables the reduction of the number of necessary wirings to a minimum, so that the aperture ratio can be improved.

With reference to FIG. 1, the arrangement relationship of pixels will be confirmed. First, an explanation focusing on an adjoining pixel pair configured by the pixels P31 and P32 will be given. In order to simplify the explanation, this adjoining pixel pair will be denoted as an adjoining pixel pair (P31, P32). An adjoining pixel pair (P23, P22) and an adjoining pixel pair (P42, P43) adjoin to the adjoining pixel pair (P31, P32) in the +X direction. The adjoining pixel pair (P22, P23) has the data line D2 as the common data line. An expression "common data line" means that respective pixels of the adjoining pixel pair are connected to the common data line arranged therebetween and a data potential supplied through the common data line is written in respective pixels at a predetermined timing. The adjoining pixel pair (P31, P32) has the data line D3 as the common data line, so that it can be expressed that the adjoining pixel pairs (P31, P32) and (P22, P23) have the common data lines D which are different from each other. Note that respective common data lines D adjoin to each other.

Another adjoining pixel pair (P42, P43) adjoins to the adjoining pixel (P31, P32) in +X direction. Likewise, those adjoining pixel pairs have common data lines D which are different from each other.

Furthermore, an adjoining pixel pair (P34, P33) is arranged relative to the adjoining pixel pair (P23, P22) or the adjoining pixel pair (P42, P43) in the +X direction. Like the adjoining pixel pair (P31, P32), the adjoining pixel pair (P34, P33) has the data line D3 as the common data line. That is, an adjoining pixel pair having the same data line D as the common data line is arranged for each pixel column. In other words, the data line D connected to the adjoining pixel pair configuring the right-eye pixel 4R is not connected to the adjoining pixel pair configuring the left-eye pixel 4L.

In the adjoining pixel pair configured by the pixels P22 and P23, the pixel P22 located at the −Y direction side relative to the common data line D2 is controlled by the gate line G2 located at −X direction side, and the pixel P23 located at +Y direction side relative to the data line D2 is controlled by the gate line G3 located at +X direction side. That is, the adjoining pixel pair has respective subpixels arranged up and down so as to sandwich the common data line G therebetween, the subpixel on the +Y side is connected to the gate line G on the +X side.

Conversely, in the adjoining pixel pair configured by the pixels P31 and P32, the pixel P32 located at −Y direction side relative to the common data line D3 is controlled by the gate line G2 located at +X direction side, and the pixel P31 located at +Y direction side relative to the data line D3 is controlled by the gate line G1 located at −X direction side. That is, the adjoining pixel pair has respective subpixels arranged up and down so as to sandwich the common data line D therebetween, and the subpixel on the +Y side is connected to the data line D on the −X side. In the subpixel columns adjoining in +X direction, the adjoining pixel pair having the subpixel on the +Y side controlled by the gate line G on the −X side is arranged at −Y side relative to the adjoining data line D. As a result, the same kind of adjoining pixel pairs are arranged in an inclined direction. In other words, the present exemplary embodiment comprises the adjoining pixel pairs of which the subpixel on the +Y side is connected to the data line D on the −X side and the adjoining pixel pairs of which the subpixel on the +Y side is connected to the data line D on the +X side.

The pixel layout shown in FIG. 3 corresponds to, in FIG. 1, a relationship between the adjoining pixel pair (P34, P33) and the subpixels P25, and P45 adjoining in the +X direction. Moreover, the pixel layout shown in FIG. 4 corresponds to, for example, in FIG. 1, a relationship between the adjoining pixel pair (P31, P32) and the subpixels P22, and P42. The pixel array of the TFT substrate 2a in the display element 2 of the present exemplary embodiment is formed by arranging the subpixels shown in FIGS. 3 and 4 alternately in the X direction and in the Y direction.

Moreover, the display region in each subpixel, i.e., the region used for a display is formed in a substantially trapezoidal shape. The shape of the pixel electrode 4PIX is also in a substantially trapezoidal shape corresponding to the shape of the display region. The adjoining pixel pairs 4PAIR1 and 4PAIR2 can be expressed such that two subpixels having substantially trapezoidal display regions are arranged so as to join respective upper bottoms of the trapezoids. The pixel thin-film transistor 4TFT is arranged at the upper bottom side of the display region in a substantially trapezoidal shape, and configures the adjoining pixel pairs 4PAIR and 4PAIR2. In the present exemplary embodiment, the pixel thin-film transistor 4TFT is provided between the upper bottoms of subpixels 4S that are adjacent with the upper bottoms of their display regions facing each other with the intention of a higher aperture ratio.

The charging capacitor line CS is arranged so as to connect respective charging capacitor electrodes CS2 of subpixels 4S adjoining in the running direction of the gate line G, i.e., the Y axis direction. The charging capacitor electrode CS2 is arranged at the upper bottom side of the display region in a substantially trapezoidal shape in each subpixel like the pixel thin-film transistor 4TFT. Hence, regions forming the charging capacitors 4CS can be efficiently arranged between respective upper bottoms of subpixels configuring the adjoining pixel pair 4PAIR, thereby further improving the aperture ratio.

The pixel thin-film transistors 4TFT provided at respective adjoining pixel pairs 4PAIR1, and 4PAIR2 each employ a double-gate structure formed in a rectangular shape with a side being opened, and are arranged so that respective opened sides face with each other. The charging capacitor electrode CS2 is formed between the pixel thin-film transistors 4TFT of a double-gate structure so as to face with each other, and the charging capacitor 4CS is formed between the silicon layer 4SI provided at each subpixel 4S and the charging capacitor electrode CS2.

Respective channels of the pixel thin-film transistors 4TFT in the adjoining pixel pairs 4PAIR1 and 4PAIR2 are arranged so as to be parallel to the image separating direction, i.e., the X axis direction. The channel is the operation part of the pixel thin-film transistor 4TFT and should be uniform throughout a subpixel 4S. The data line D is inclined in a different direction from the image separating direction, i.e., the X axis direction at the upper layer of the channel region. Moreover, the data line D is inclined in a different direction from the image separating direction on the charging capacitor electrode CS2. As explained above, the data line D runs in the X axis direction through several bendings at the upper layers of the pixel thin-film transistor 4TFT and the charging capacitor electrode CS2 both arranged at the upper bottom of a trapezoid.

Bending of the data line D at the upper bottom of the trapezoid enables efficient arrangement of the data line D, so that the aperture ratio can be improved. Moreover, since the channel of the pixel thin-film transistor 4TFT is arranged so as to be parallel to the X axis direction, the transistor characteristics can be made uniform by orienting the channel of the pixel thin-film transistor 4TFT equally according to the excimer laser scanning direction in the case of using laser annealing to form a polysilicon thin film.

The charging capacitor line CS is electrically connected to the charging capacitor electrode CS2. Hence, the charging capacitor electrodes CS2 of respective subpixels configuring the adjoining pixel pair 4PAIR have the same potential. Since the substantially trapezoidal pixels in the adjoining pixel pair 4PAIR are joined together so that respective upper bottoms of the trapezoids face with each other, the area for forming the charging capacitor 4CS can be efficiently secured by providing the common charging capacitor electrode CS2 to reduce the wasted space. Accordingly, the aperture ratio can be increased in comparison with conventional technologies, and the transmissivity can be increased.

As explained above, the data line D connected to an adjoining pixel pair 4PAIR constituting a right-eye pixel 4R is not connected to an adjoining pixel pair 4PAIR constituting a left-eye pixel 4L. Therefore, with the odd-numbered data lines D1, D3, D5, D7, D9, D11 and D13 and even-numbered data lines D2, D4, D6, D8, D10, and D12 being driven independently, the right-eye pixel 4R and left-eye pixel 4L can operate separately to display a simplified parallax image. The stereoscopic visibility can be inspected simply by supplying signals to the even-numbered data lines D and to the odd-numbered data lines D separately in the production process of installing the lenticular lens 3 on the display element 2; then, the production yield in the subsequent process can be improved. The same signal can be supplied to the even-numbered lines or to the odd-numbered lines at a time. The switch for changing the input signals between the even-numbered and odd-numbered lines can be formed on the TFT substrate 2a concurrently with the pixel thin-film transistor TFT. In this way, the inspection device can be simplified.

Figure 8:
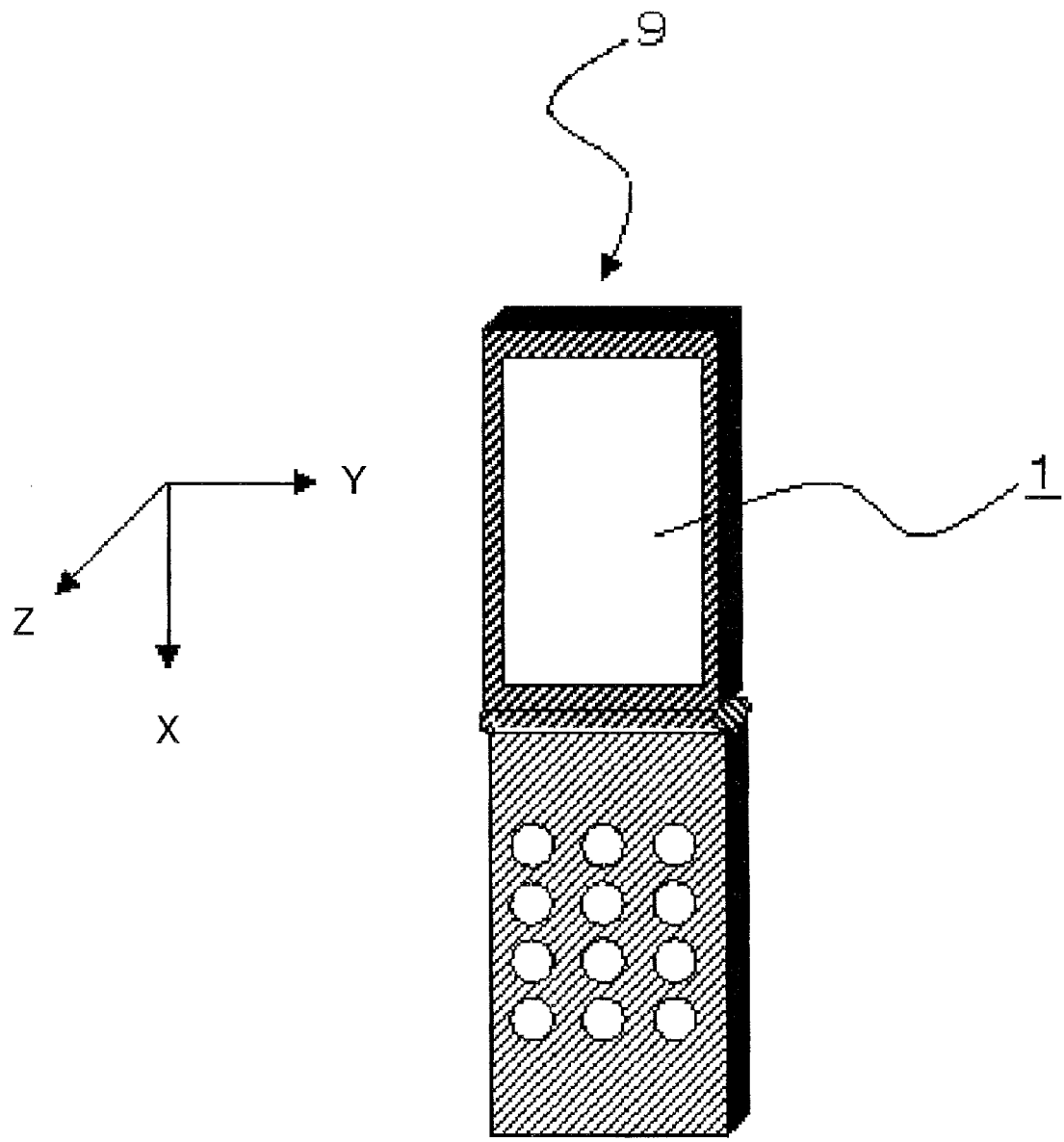
FIG. 8 is a perspective view showing a portable device on which the image display device according to the first exemplary embodiment of the present invention is mounted.
Figure 9:
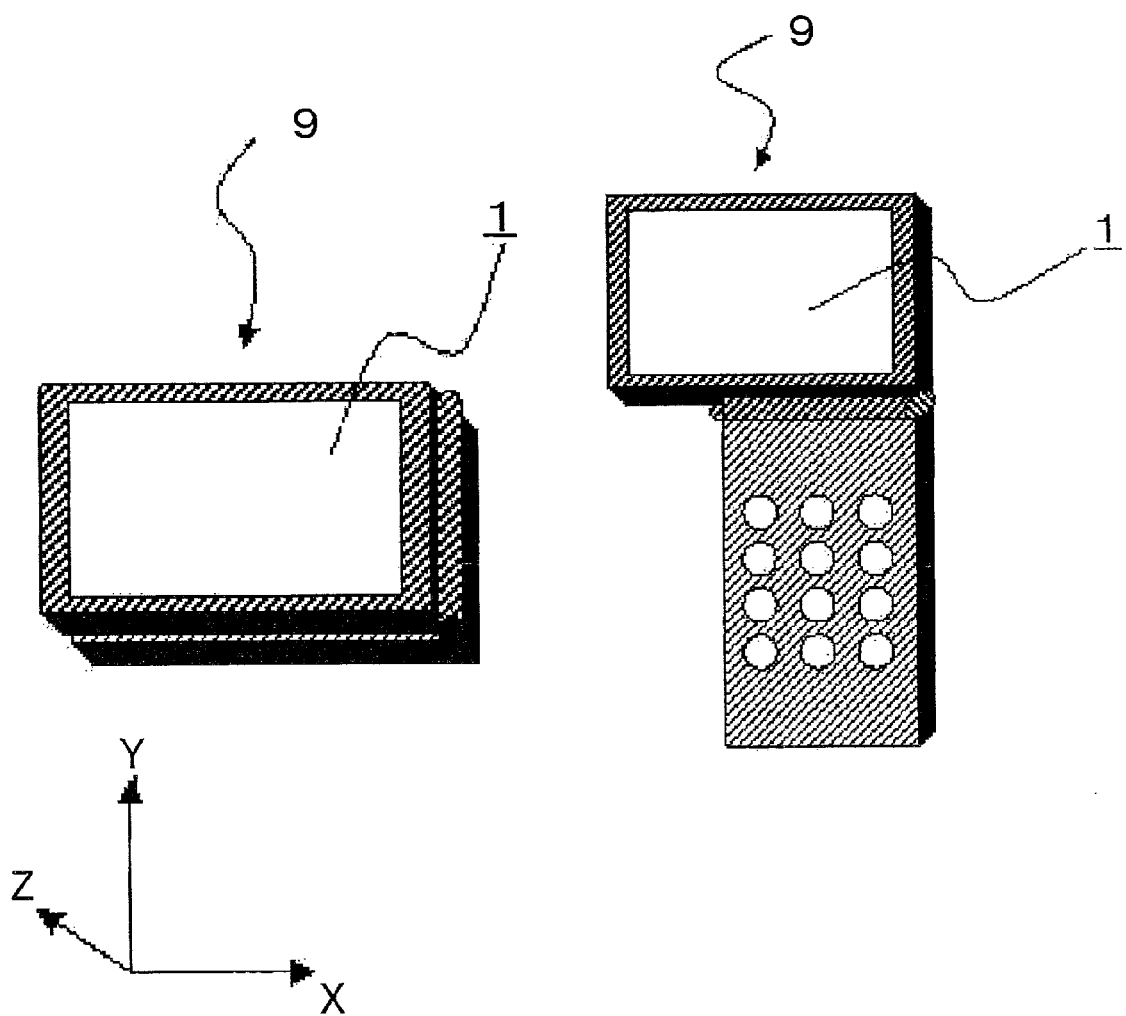
FIG. 9 is a perspective view showing a portable device on which the image display device according to the first exemplary embodiment of the present invention is mounted.

As shown in FIGS. 8 and 9, the image display device 1 according to the present exemplary embodiment can be mounted on a cellular phone 9. In FIG. 8, the X axis direction of the image display device 1 is the vertical direction of the screen of the cellular phone 9, and the Y axis direction of the image display device 1 is the horizontal direction of the screen of the cellular phone 9. The screen part of the cellular phone 9 shown in FIG. 8 is provided with a hinge including a rotating shaft, and is freely rotatable as shown in FIG. 9. Hence, the orientation of the display screen can be changed according to the usage environment so that the image separating direction, namely the X axis, direction is substantially parallel to a line interconnecting both eyes of the viewer, whereby the user can easily view stereoscopic display. Moreover, since the display element 2 according to the present exemplary embodiment has a narrow frame as explained above, the image display device 1 can be suitably applied to the portable device without deteriorating the functions, designs, and operability requisite for the portable device.

Next, an explanation will be given of the subpixel structure according to the present exemplary embodiment and the effect thereof. Here, the vertical aperture ratio is a value obtained by dividing, by the subpixel pitch in the Y axis direction, the total width of the aperture in the Y axis direction when the subpixel is cut using a line segment running in a direction (the Y axis direction) orthogonal to the image separating direction (in the present exemplary embodiment, the X axis direction) of the image separating unit. In the plural-view-point display device, in order to accomplish reduction in occurrence of 3D crosstalk and improvements of the stereoscopic image quality, it is necessary to make the vertical aperture ratio maximum while maintaining the vertical aperture ratio of a subpixel substantially constant regardless of the horizontal position. Here, it is desirable that the vertical aperture ratio is maximized while the vertical aperture ratio is maintained substantially constant regardless of the image separating direction.

First, regarding the arrangement of the gate line G and the data line D, it is preferable that the gate line G and the data line D should be arranged around each subpixel. This enables reduction of a dead space between wirings and improves the aperture ratio. In other words, it is preferable to avoid an arrangement in which respective gate lines D or respective data lines D adjoin to each other without a subpixel intervening therebetween. This is because when the same kinds of wirings adjoin to each other, it is necessary to make the wirings spaced apart in order to suppress any short-circuiting, and such a space becomes a dead space that reduces the aperture ratio.

In particular, in the case of the stereoscopic image display device, at least the image separating direction is set to be the horizontal direction of the image display device. In the present exemplary embodiment, a cylindrical lens 3a having the optical axis 30 parallel to the Y axis direction covers a right-eye pixel 4R and a left-eye pixel 4L adjacent in the X axis direction. As shown in FIGS. 3, 4, and 6, the optical axis 30 crosses the gate line G and charging capacitor line CS at the center of a unit of display 4U. The optical axis 30 nearly coincides with a line A-A'. Here, the line A-A' is a virtual line parallel to the Y axis and passing through the center of the unit of display 4U in the X axis direction. A line B-B' is a virtual line parallel to the Y axis and passing through the center of the adjoining pixel pair 4PAIR in the X axis direction.

Figure 17:
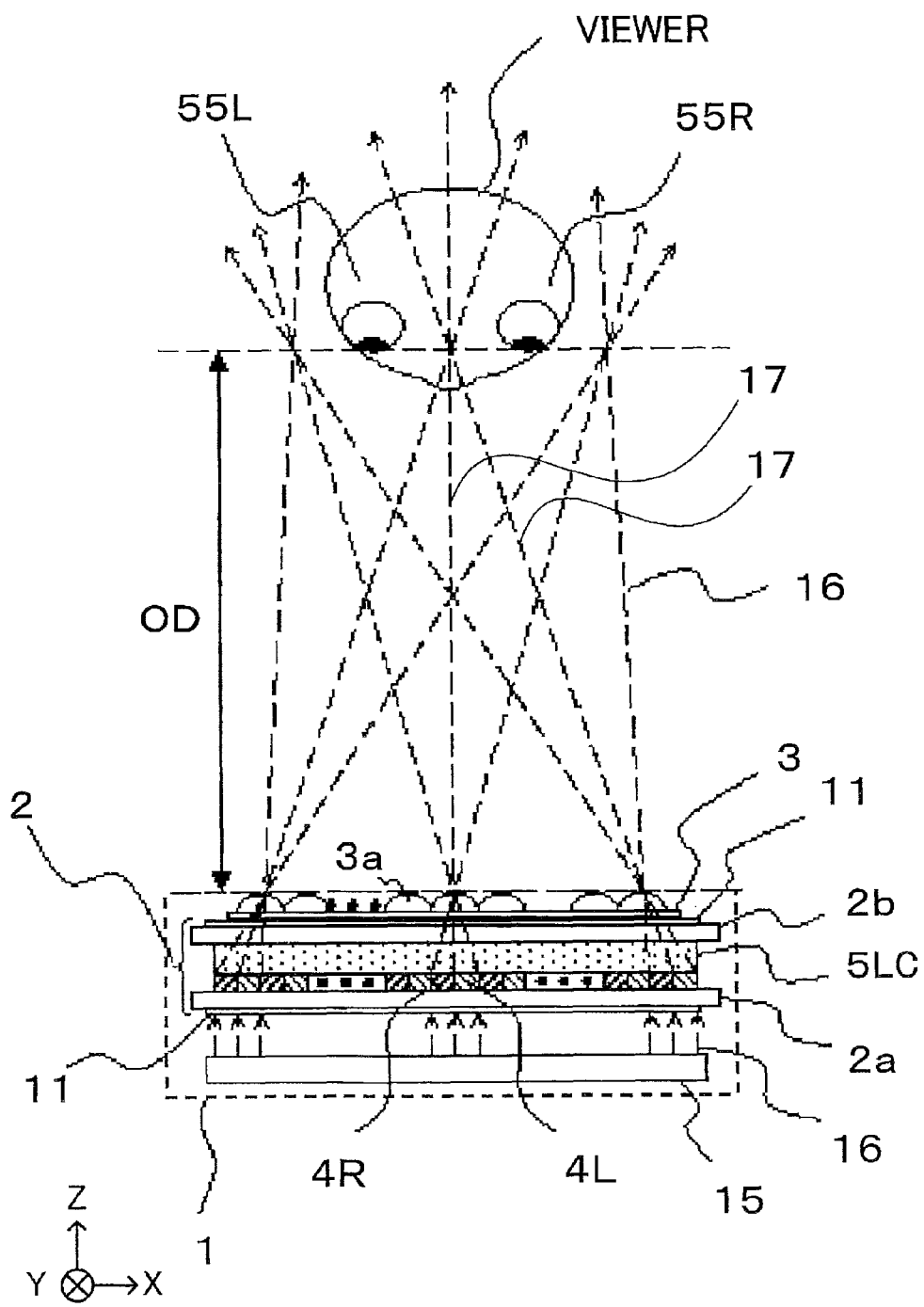
FIG. 17 is a conceptual diagram showing how light is collected by the image display device according to the first exemplary embodiment of the present invention.
Figure 18:
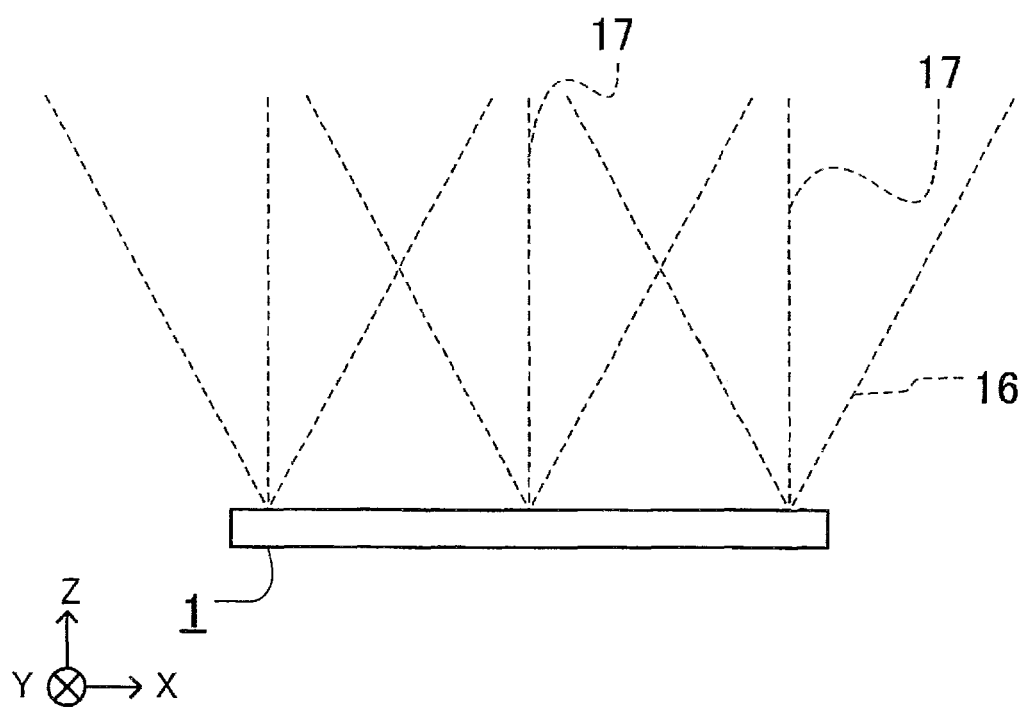
FIG. 18 is a conceptual diagram showing a stereoscopic image display device to which the spatial image scheme is applied.

On the other hand, as shown in FIGS. 17 and 18, the direction of light emitted from the cylindrical lenses 3a of the lenticular lens 3 is determined according to the viewing position of the viewer. The lines 17 presenting the center axis of image separation head for the viewer. The right-eye and left-eye images are delivered to the left eye 55L and right eye 55R, respectively, with respect to the center axis of image separation. The cylindrical lenses 3a have a convex, curved surface, of which the highest point in the Z axis direction is the vertex. A virtual line segment extending along the vertex of a cylindrical lens 3a in the longitudinal direction of the lens convex part will be the optical axis 30 when the cylindrical lens 3a and unit of display 4U have the same pitch. However, since the pitch L of the cylindrical lenses 3a is different from the pitch Pu of the units of display 4U in the present exemplary embodiment when the cylindrical lenses 3a and units of display 4U are seen in the direction perpendicular to the display surface, the vertex of a cylindrical lens 3a does not always coincide with the center line A-A' of a unit of display 4U. This is because the lines 17 presenting the center axis of image separation gather at the viewer and the center axis of image separation seen by the viewer serves as an apparent optical axis 30. In this specification, the center axis of image separation seen from the position of the viewer is defined as the optical axis 30. As shown in FIG. 18, since the line 17 presenting the axis of image separation is perpendicular to the display surface and the optical axis 30 for observation in the direction perpendicular to the display surface coincides with the line A-A' at the center of the display part of the display element 2, the illustrations in FIGS. 3, 4, and 6 are presented.

Furthermore, the gate line G and charging capacitor line CS have to be bent from the arrangement direction in order to obtain a nearly constant vertical aperture ratio regardless of the position in the image separating direction. The gate line G and charging capacitor line CS are close to each other at their inclined portions and extend along the inclined side of a trapezoid. The vertical aperture ratio can be restricted by factors such as the above bent structure at the inclined portion and the lower and upper bottom structures of a trapezoidal aperture. More specifically, as for the vertical line crossing the inclined portion such as the line A-A' in FIGS. 3, 4, and 6, the width in the Y axis direction of the black matrix 60 covering the inclined portions of the gate line G and charging capacitor line CS and the width in the Y axis direction of the black matrix 60 covering the data line D at the lower bottom of a nearly trapezoidal pixel affect the vertical aperture ratio. Furthermore, as for the vertical line crossing the center of a subpixel 4S such as the line B-B' in FIGS. 3, 4, and 6, the width in the Y axis direction of the black matrix 60 covering the charging capacitor electrode CS2 at the upper bottom and the data line D at the lower bottom affects the vertical aperture ratio.

What is common to both A-A' line and B-B' line is the light blocking width in the Y axis direction of the black matrix 60 at the lower bottom of the substantially trapezoidal pixel. Hence, an explanation will be given of a structure that minimizes the width of the lower bottom in the Y axis direction. As explained above, it is necessary to arrange at least one data line D at the light blocking portion located at the lower bottom. In order to minimize the width of the lower bottom in the Y axis direction, it is preferable that only one data line D should be the structural object. For example, when a thin-film transistor 4TFT is arranged at the lower bottom, the width of the lower bottom in the Y axis direction increases by what corresponds to such a transistor, so that it is not preferable. In particular, in the line A-A' line, lower bottoms are arranged so as to overlap with each other, the increase of the width of the lower bottom in the Y axis direction largely affects. Hence, it is preferable to avoid arranging a structural object at the lower bottom of the substantially trapezoidal pixel as much as possible. Accordingly, it becomes possible to reduce the number of processes while reducing the width of the lower bottom in the Y axis direction.

Next, the width in the Y axis direction of the inclined wire at the line A-A' is discussed. The wire is bent at this inclined portion. Therefore, the width in the Y axis direction is increased by the bending. For example, the width of the inclined portion in the Y axis direction is W1/cos θ in which θ is the inclination with respect to the X axis and W1 is the line width of the inclined portion. For example, when θ is 60 degrees, the width of the inclined portion in the Y axis direction is twice the width. As just described, the width of the inclined portion in the Y axis direction is affected by a factor of 1/cos θ of the width. It is very important to reduce the width of the inclined portion in the Y axis direction.

In order to reduce the width of the inclined portion, it is preferable to provide as few structures as possible on the inclined portion. For example, if a pixel thin-film transistor 4TFT is provided on the inclined portion, the width is accordingly increased and the width in the Y axis direction is increased by a factor of 1/cos θ. Therefore, it is not preferable to provide some structure on the inclined portion. However, as explained above, at least one gate line G has to be provided on the inclined portion.

Finally, an explanation will be given of the width of the upper bottom in the Y axis direction in the line B-B'. As explained above, because it is difficult to arrange a thin-film transistor 4TFT and charging capacitor electrode CS at the lower bottom and at the inclined portion, it is necessary to arrange them at the upper bottom. Moreover, arrangement that reduces the width of the upper bottom in the Y axis direction is important. As is apparent from FIG. 3, the structural object that has the longest width in the Y axis direction at the upper bottom is the image pixel thin-film transistor 4TFT. Moreover, the charging capacitor electrode CS2 and pixel thin-film transistor 4TFT have to be spaced to prevent short-circuit. Then, in the present invention, a common charging capacitor electrode CS2 is provided between two pixel thin-film transistors 4TFT connected to different subpixels from each other so as to reduce the width of the upper bottom in the Y axis direction.

A vertical aperture ratio A in the line A-A' and a vertical aperture ratio B in the line B-B' can be expressed by the following formulae based on the distances shown in FIG. 6.

$$A=(Y1+Y2-W1/\cos\phi)/(Y1+Y2+2\times Y3) \quad [\text{Math 4}]$$

$$B=Y1/(Y1+Y2+2\times Y3) \quad [\text{Math 5}]$$

Here, the inclination of the wires is defined as a positive angle in the anticlockwise direction with respect to the +X direction at 0 degree. The gate line G is inclined in a direction different from the image separating direction in each subpixel 4S. The charging capacitor line CS is inclined in a direction different from the image separating direction in each subpixel 4S with the same inclination as the gate line G next to it in the subpixel 4S.

The charging capacitor line CS is parallel to the gate line G next to it in a subpixel 4S. In a subpixel of an adjoining pixel pair 4PAIR of which the upper bottom faces in the +Y direction, the gate line G on the −X side has an inclination $\theta 1$ and the gate line G on the +X side has an inclination $\theta 2=-\theta 1$. In a subpixel of which the upper bottom faces in the −Y direction, the gate line G on the −X side has an inclination $\theta'1=-\theta 1$ and the gate line G on the +X side has an inclination $\theta'2=\theta 1$.

The gate line G is arranged at a boundary between the adjoining subpixels in the X axis direction, and respective ends of pixel electrodes of adjoining subpixels are proximate to each other in the vicinity of the inclined portion of the gate line G. Hence, in the vicinity of the inclined portion of the gate line G, because of the effect of an electric field generated by the pixel electrode 4PIX and the gate line G, the orientation of the liquid crystal molecules is disturbed and a disclination is likely to occur. Accordingly, the contrast may be reduced because of light leaking from the backlight. In particular, in the case of the stereoscopic display element having an image separating unit, local leaking of light in the subpixel is enhanced, and uneven brightness occurs, resulting in the reduction of the display quality. Accordingly, it is desirable to provide a light blocking layer in the vicinity of the inclined portion of the gate line G in order to reduce light leaking. In the present exemplary embodiment, as shown in FIGS. 5 and 6, the upper layer of the gate line G is covered by the black matrix 60 provided on the opposing substrate 2b in order to block light. It is desirable that the inclination of the inclined portion of the wires on the TFT substrate 2a is equal to the inclination of the inclined portion of the black matrix 60. It is desirable to provide the black matrix 60 so as to be widened in consideration of the margin for miss-overlapping of the TFT substrate 2a and the opposing substrate 2b.

A wiring material provided at the TFT-substrate-2a side may be appropriately used in order to block light instead of the black matrix 60. When a light blocking portion is provided at the TFT-substrate-2a side, it can be highly precisely patterned on the substrate, so that the line width of the light blocking layer can be set small, and thus the aperture ratio can be increased. In particular, by reducing the line width of the light blocking layer, 3D moire generated at the boundary between the right and left separated images can be reduced, thereby improving the display quality of a stereoscopic image.

Because the inclined portion of the gate line G is covered by the black matrix 60, the vertical aperture ratio may be affected by the overlapping precision of the TFT substrate 2a and the opposing substrate 2b and vary. It is desirable to design such that the fluctuation of the vertical aperture ratio originating from the overlapping precision is within the range of ±10%.

Moreover, in order to increase the aperture ratio in a desired subpixel, it is desirable that a light-blocking-portion width Y2 of the upper bottom of the substantially trapezoidal pixel should be smaller than a width Y1 of the trapezoidal aperture in the Y axis direction, and a following relationship should be satisfied.

$$Y1>Y2 \quad [\text{Math 6}]$$

The gate line G is situated at the center of a unit of display 4U and largely responsible for the right and left images separation performance. Particularly, when the gale line G has a larger inclination, a region X3 where the images of right and left subpixels mix is increased and then 3D crosstalk is augmented. Therefore, the inclination of the gate line G cannot be large. Particularly, as shown in FIG. 6, it is preferable that the aperture included in the region X3 where the right and left images mix occupies 10% or less of the pixel aperture ratio.

Moreover, in order to reduce 3D crosstalk, it is desirable to satisfy the following relationship:

$$X1>X2 \quad [\text{Math 7}]$$

Moreover, in order to reduce 3D crosstalk and increase the aperture ratio, it is desirable to increase X1. Then, it is desirable to satisfy the following relationship.

$$X1>(2\times X2)>X3 \quad [\text{Math 8}]$$

In general, it is most efficient when the charging capacitor line CS is arranged in the vicinity of the thin-film transistor 4TFT from the standpoint of formation of the charging capacitor 4CS. This is apparent from the fact that the charging capacitor 4CS is formed between the electrode connected to the drain electrode of the pixel thin-film transistor 4TFT and the electrode connected to the charging capacitor line CS. In particular, in the present exemplary embodiment, the charging capacitor electrode CS2 is provided between the pixel thin-film transistors 4TFT controlling respective subpixels 4S of the adjoining pixel pair 4PAIR, and the adjoining pixel pairs 4PAIR have the common charging capacitor electrode CS2, so that the region for forming the charging capacitor 4CS is efficiently laid out, thereby improving the aperture ratio.

The pixel thin-film transistors 4TFT at the upper bottoms of the substantially trapezoidal pixels control the pixel at +Y side and the pixel at −Y side, respectively, which adjoin in the Y axis direction. Accordingly, at the intersection between the charging capacitor electrode CS2 and the data line D, the data line D is arranged and inclined in a different direction from the image separating direction. As shown in FIG. 3, the data line D inclined at the upper layer of the charging capacitor electrode CS2 is arranged at an angle θD2 from the image separating direction and connected to the pixel thin-film transistor 4TFT for driving the adjoining pixel pair 4PAIR. The data line D arranged at the upper layer of the charging capacitor electrode CS2 is arranged and inclined in a different direction from the image separating direction, so that an unprofitable space is reduced, but can be used as a space for the charging capacitor electrode CS2.

The silicon thin-film portion of the pixel thin-film transistor 4TFT is stacked on the data line D. The data line D is arranged and inclined in a different direction from the image separating direction at the upper layer of the silicon thin-film portion. The angle between the data line D and the X axis direction at the upper layer of the silicon thin-film is θD1.

Regarding the pixel thin-film transistor 4TFT, the data line D, and the contact holes 4CONT1 and 4CONT2 at the upper bottom of the trapezoid, the relationship among those is symmetrical around a point around the center point of the data line D provided on the charging capacitor electrode CS2. In the present exemplary embodiment, such layout of the transistor and that of data line D minimize the layout area, and thus the aperture ratio of the pixel is increased.

A light blocking layer and a color filter may be arranged at the TFT-substrate-2a side. This improves the overlapping precision, so that the width of the light blocking layer can be reduced and the aperture ratio can be increased. Moreover, by reducing the width of the light blocking layer covering the gate line G, 3D moire can be reduced, and thus the display quality can be improved.

Next, a driving method of the image display device 1 employing the above-explained configuration according to the present exemplary embodiment, i.e., a display operation will be explained. In the present exemplary embodiment, the image display device 1 is driven through a dot inversion driving. As shown in FIG. 10, the dot inversion driving is a driving technique that causes the polarity of display data transmitted for each data line to be inverted relative to a reference potential, causes the polarity of display data transmitted through each data line for each gate line to be inverted, and causes the polarity of display data to be inverted for each frame. The dot inversion driving is called a 1H1V inversion driving. This is because the polarity is inverted for each data line arranged in a horizontal direction (an H direction) and for each gate line arranged in a vertical direction (a V direction).

As a result of dot inversion driving, the image display device 1 realizes the polarities of subpixels as shown in FIG. 11 in a given frame. First, when the gate line G1 is selected, display data with a positive polarity is transmitted to the data line D1, and a voltage with a positive polarity is written in the pixel P11. Moreover, display data with a negative polarity is transmitted to the data line D2. Likewise, pieces of display data with a positive polarity are transmitted to the data lines D3, D5, D7, D9, D11, and D13, respectively, and pieces of display data with a negative polarity are transmitted to the data lines D4, D6, D8, D10, and D12, respectively. Next, when the gate line G2 is selected, respective polarities of all data lines are inverted. That is, pieces of display data with a negative polarity are transmitted to the data lines D1, D3, D5, and D7, respectively, and pieces of display data with a positive polarity are transmitted to the data lines D2, D4, and D6, respectively. Likewise, when the gate lines G3, G5, and G7 are selected, respectively, the same state is applied like when the gate line G1 is selected, and when the gate line G4 is selected, the same state is applied like when the gate line G2 is selected. When this frame ends, in the next frame, polarity inversion is further performed. That is, when the gate lines G1, G3, G5, D9, D11, and D13 are selected, respectively, pieces of display data with a negative polarity are transmitted to the data lines D1, D3, D5, and D7, respectively, and pieces of display data with a positive polarity are transmitted to the data lines D2, D4, D6, D8, D10, and D12, respectively. Moreover, when the gate lines G2, G4, and G6 are selected, respectively, pieces of display data with a positive polarity are transmitted to the data lines D1, D3, D5, D7, D9, D11, and D13, respectively, and pieces of display data with a negative polarity are transmitted to the data lines D2, D4, D6, D8, D10, and D12, respectively.

A subpixel group configured by the right-eye pixels 4R has a polarity distribution that brings about a two-line dot inversion (2H1V dot inversion) effect. The same is true of a subpixel group configured by the left-eye pixels 4L. Hence, the polarity distribution of an image visually recognized by one eye is viewed as if the polarity is inverted for each two data lines D arranged in the horizontal direction (the H direction) or for each gate line G arranged in the vertical direction (the V direction). The basic sets of the polarity distribution according to the present exemplary embodiment are four pixels in the X axis direction and four pixels in the Y axis direction, a total of 16 pixels.

In the present exemplary embodiment, when display data is written in each pixel, a potential change in the charging capacitor line CS can be controlled. This is because the charging capacitor electrode CS2 common to the adjoining pixel pairs 4PAIR is connected to not only a pixel where the display data with a positive polarity is written during successive two gate selection cycles but also a pixel where the display data with a negative polarity is written. Hence, it is possible to suppress a fluctuation of the potential of the charging capacitor line CS toward a polarity at one side, and suppress crosstalk occurring in the direction in which the charging capacitor line CS runs is reduced, thereby accomplishing a high-quality display. The configuration of the present exemplary embodiment accomplishes a two-line dot inversion effect and the potential-fluctuation suppression effect of each charging capacitor line CS through a general dot inversion driving, and causes respective polarities of pixels having trapezoidal apertures adjoining at respective bottom sides to be same. Accordingly, a high-quality display is enabled at a low cost.

An example of the reference potential in the dot inversion driving is the potential of the common electrode to the pixel electrode. In a precise sense, however, a DC offset is applied to the common electrode potential in order to reduce the effect of the feed-through by the thin-film transistor 4TFT, and is different from the reference potential.

An exemplary configuration of the image display device 1 according to the present exemplary embodiment and conditions for the lenticular lens 3 to serve as an image distributing unit will be described hereafter. In the present exemplary embodiment, it is necessary for the image distributing unit to distribute light emitted from respective subpixels into different directions along a first direction in which the left-eye pixels 4L and the right-eye pixels 4R are arranged, i.e., the X axis direction. Accordingly, an explanation will be given of a case in which the image distributing effect is maximized at first.

Figure 12:
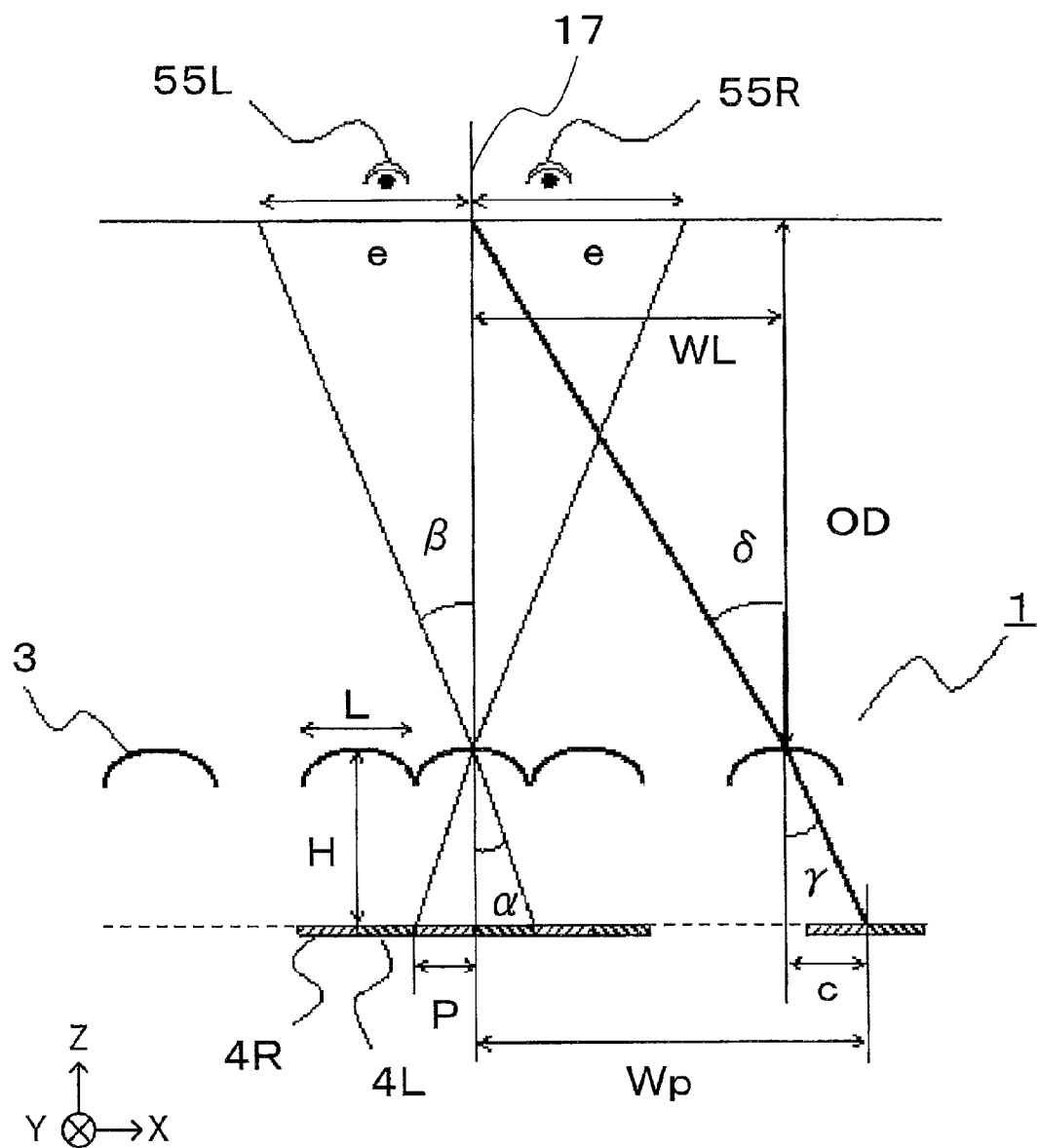
FIG. 12 is a cross-sectional view showing an optical model when a lenticular lens is used.

As shown in FIG. 12, lights emitted from the left-eye and right-eye pixels 4L and 4R are distributed by the image separating unit to the left-eye and right-eye observation regions on either side of the line 17 presenting the center axis of image separation. It is assumed that H is the distance between the principal point, or vertex, of the lenticular lens 3 and a subpixel, n is the refractive index of the lenticular lens 3, and L is the lens pitch. Here, P is the pitch of subpixels corresponding to a view point in the image separating direction. In other words, in the present exemplary embodiment, the pitch Px in the X axis direction of each of the left-eye pixels 4L and right-eye pixels 4R is P. The arrangement pitch Pu in the image separating direction of units of display 4U consisting of a left-eye pixel 4L and a right-eye pixel 4R is 2P.

Moreover, it is presumed that a distance between the lenticular lens 3 and the viewer is an optimum viewing distance OD, and the period of an enlarged projection image of a subpixel in the distance OD, i.e., respective cycles of the widths of the projection images by the left-eye pixel 4L and the right-eye pixel 4R on a virtual plane parallel to the lens and distant from the lens by the distance OD are e. Furthermore, it is presumed that a distance from the center of the cylindrical lens 3a located at the center of the lenticular lens 3 to the center of the cylindrical lens 3a located at an end of the lenticular lens 3 in the X axis direction is WL, and a distance between the center of the unit of display 4U that is the left-eye pixel 4L or the right-eye pixel 4R located at the center of the display element 2 and the center of the unit of display 4U located at an end of the display element 2 in the X axis direction is WP. Furthermore, it is presumed that a light incident angle and a light outgoing angle of the cylindrical lens 3a located at the center of the lenticular lens 3 are α and β, respectively, and a light incident angle and a light outgoing angle of the cylindrical lens 3a located at an end of the lenticular lens 3 in the X axis direction are γ and δ, respectively. Still further, it is presumed that a difference between the distance WL and the distance WP is C and the number of subpixels included in a region with the distance WP is 2m.

The arrangement pitch L of the cylindrical lenses 3a and the arrangement pitch P of the subpixels relate to each other, so that either one of the pitches is set in accordance with another pitch. In general, the lenticular lens 3 is often designed in accordance with the display element, the arrangement pitch P of the subpixels is taken as a constant. Moreover, the refractive index n is set by selecting the material of the lenticular lens 3. In contrast, the viewing distance OD between the lens and the viewer and the period e of the pixel enlarged projection image in the viewing distance OD are set to be desirable values. Based on those values, a distance H between the vertex of the lens and the subpixel and a lens pitch L are set. The following formulae 9 to 17 are satisfied based on the Snell's law and a geometric relationship.

$$n \times \sin\alpha = \sin\beta \qquad \text{[Math 9]}$$

$$OD \times \tan\beta = e \qquad \text{[Math 10]}$$

$$H \times \tan\alpha = P \qquad \text{[Math 11]}$$

$$n \times \sin\gamma = \sin\delta \qquad \text{[Math 12]}$$

$$H \times \tan\gamma = C \qquad \text{[Math 13]}$$

$$OD \times \tan\delta = WL \qquad \text{[Math 14]}$$

$$WP - WL = C \qquad \text{[Math 15]}$$

$$WP = Pu \times m = 2 \times m \times P \qquad \text{[Math 16]}$$

$$WL = m \times L \qquad \text{[Math 17]}$$

An explanation will be given of a case in which the image distributing effect is maximized. This is a case in which the distance H between the vertex of the lenticular lens 3 and the subpixel and a focal distance f of the lenticular lens 3 are set to be same. Hence, the following formula 18 is satisfied. When the curvature radius of the lens is r, the curvature radius r can be obtained from the following formula 19.

$$f = H \qquad \text{[Math 18]}$$

$$r = H \times (n-1)/n \qquad \text{[Math 19]}$$

The above-explained parameters are summarized below. That is, the arrangement pitch P of the subpixels is set in accordance with the display element 2, and the viewing distance OD and the period of the pixel enlarged projection image are set based on the setting of the image display device 1. The refractive index n is set based on the material of the lens, etc. The lens arrangement pitch L and the distance H between the lens and the subpixel derived from the above-explained parameters are parameters for setting the position where light from each subpixel is projected on a viewing plane. The curvature radius r of the lens is the parameter that changes the image distributing effect. That is, when the distance H between the lens and the pixel is a fixed value, if the curvature radius r of lens is changed from an ideal value, right and left images are blurred and it becomes difficult to clearly separate those images. That is, it is appropriate if the range of the curvature radius r that makes the separation effective is obtained.

Figure 13:
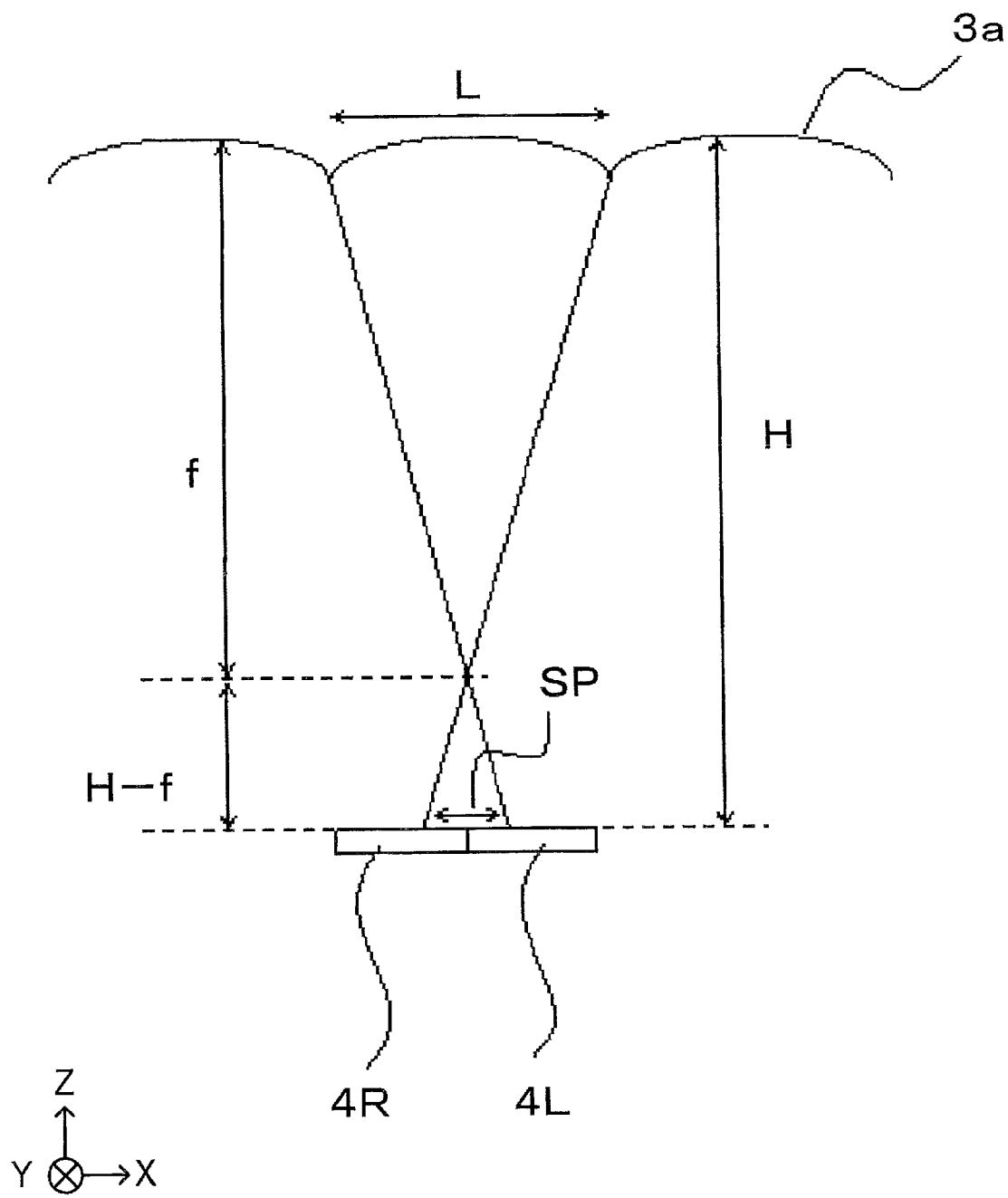
FIG. 13 is an optical model diagram showing a state in which a curvature radius is minimum in order to calculate an image separating condition of the lenticular lens.

First, the minimum value of the curvature radius r range is calculated where the separating effect by the lens is effective. As shown in FIG. 13, in order to have the separating effect, a similar relationship should be satisfied between a triangle having the lens pitch L as a bottom side and the focal distance f as a height and a triangle having the subpixel pitch P as a bottom side and H–f as a height. Hence, the following formula 20 is satisfied and the minimum value fmin of the focal distance can be obtained.

$$f\text{min} = H \times L/(L+P) \qquad \text{[Math 20]}$$

Next, a curvature radius r is calculated based on the focal distance. Based on the formula 19, a minimum value rmin of the curvature radius r can be obtained from the following formula 21.

$$r\text{min} = H \times L \times (n-1)/(L+P)/n \qquad \text{[Math 21]}$$

Figure 14:
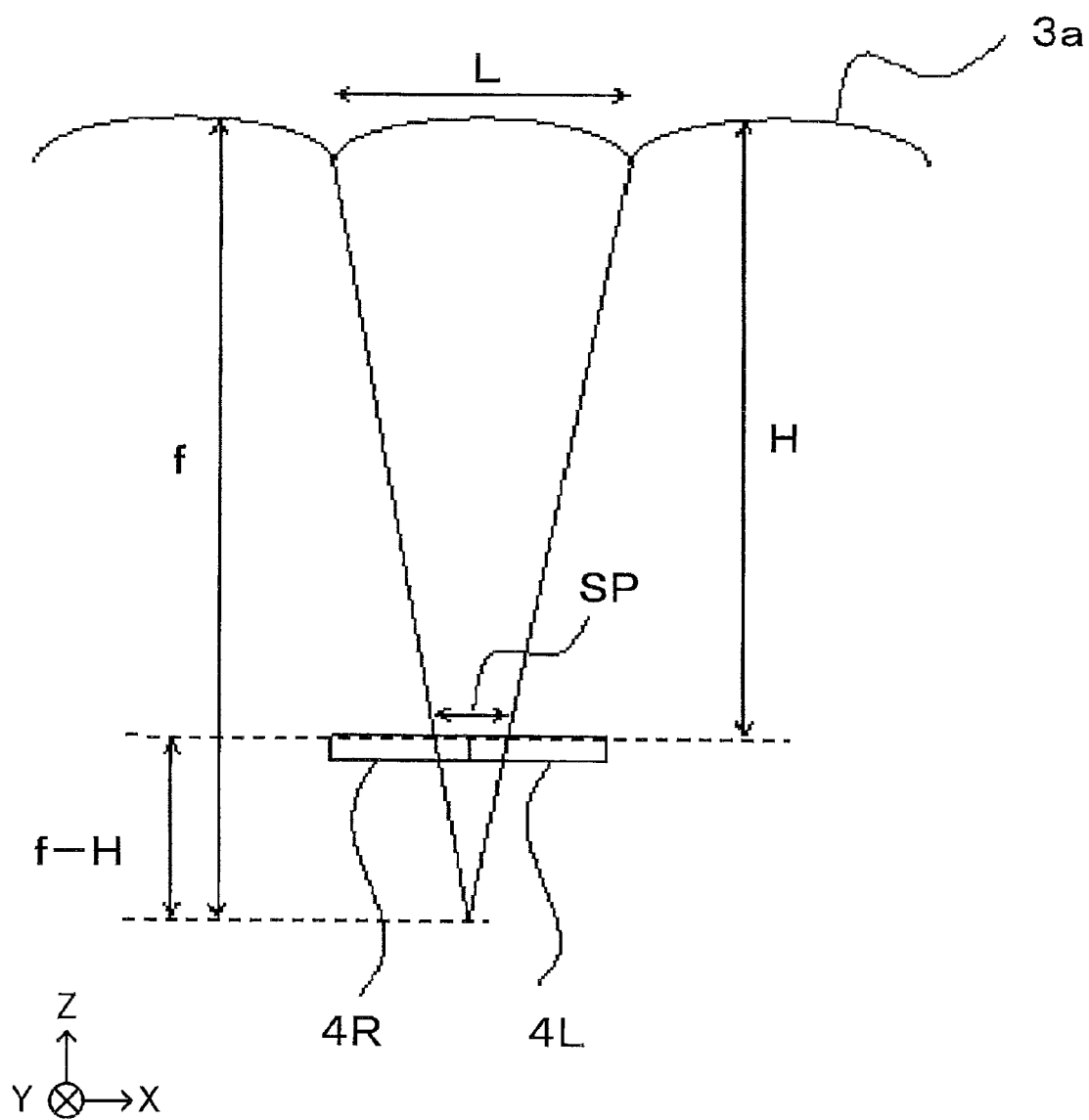
FIG. 14 is an optical model diagram showing a state in which the curvature radius is maximum in order to calculate the image separating condition of the lenticular lens.

Next, the maximum value of the curvature radius r is calculated. As shown in FIG. 14, in order to have the separating effect by the lens, a similar relationship should be satisfied between a triangle having the lens pitch L as a bottom side and the focal distance f as a height and a triangle having the subpixel pitch P as a bottom side and f–H as a height.

Hence, the following formula 22 is satisfied and a maximum value fmax of the focal distance can be obtained.

$$f\text{max} = H \times L/(L-P) \qquad \text{[Math 22]}$$

Next, a curvature radius r is calculated based on the focal distance. Based on the formula 19, a maximum value rmax of the curvature radius r can be obtained from the following formula 23.

$$r\text{max} = H \times L \times (n-1)/(L-P)/n \qquad \text{[Math 23]}$$

Below is the summary of the above explanation. In order to cause the lens to bring out the image distributing effect, it is necessary that the lens curvature radius r should be present within a range indicated by the following formula 24 derived from the formulae 21 and 23.

$$H \times L \times (n-1)/(L+P)/n \leq r \leq H \times L \times (n-1)/(L-P)/n \qquad \text{[Math 24]}$$

In the above explanation, the two-view-point stereoscopic image display device for a right-eye pixel 4R and a left-eye pixel 4L was explained, but the present invention is not limited to this type of image display device. For example, the present invention can be applied to an image display device for N number of view points. That is, according to the N number view point scheme, the pitch Pu of the unit of display 4U and the subpixel pitch P satisfy a relationship that is Pu=N×P. In this case, in the definition for the distance WP, the number of subpixels included in the region with the distance WP may be changed from 2m to N×m.

According to the above-explained configuration of the present exemplary embodiment, in order to accomplish the further improvement of image quality, it is preferable that the vertical aperture ratio should be completely constant regardless of the position in the horizontal direction. However, in particular, in the vicinity of the vertex of the inclined portion of the trapezoidal aperture, it is difficult to make the vertical aperture ratio completely constant because of a forming precision of the light blocking portion, etc. Hence, according to the present exemplary embodiment, as shown in FIGS. 13 and 14, the focal point of the lens is shifted from the subpixel surface in order to blur an image and reduce the effect originating from the forming precision of the light blocking portion, thereby accomplishing the improvement of the image quality.

A technique of setting blurred region by having the focal point of the lens shifted from the subpixel surface as explained above, and of improving the image quality is referred to as a "defocus effect" below. Moreover, the width of an effective region which can be blurred is referred to as a "spot size". In the present exemplary embodiment, the width which can be blurred effectively in the X axis direction is the spot size SP. The size of the spot size SP is set depending on a distance from the position of the lens focal point, and can be set by adjusting the sheet of lenticular lens and the thickness of the polarization plate 11 of the opposing substrate 2b.

When the width of the inclined side of the trapezoid in the X axis direction is WX1, as shown in FIG. 6, WX1=W1/sin φ1 is satisfied, and a length from the intersection between the inclined side of the trapezoidal aperture and the upper bottom thereof to the intersection between the inclined side and the lower bottom in the X axis direction is 2×X2. It is preferable that the spot size SP when the focal point of the lens is shifted from the subpixel surface should be within a range from equal to or larger than WX1 to equal to or smaller than 2×X2. When the spot size SP is WX1, it is the limit that can make the inclined region of the trapezoidal aperture compositely blurred, and it is preferable that the spot size SP should be set to be larger than such a limit. When the spot size is 2×X2, the region that can be blurred can be extended to the intersection between the inclined side of the trapezoidal aperture and the upper bottom thereof, and to the intersection between the inclined side and the lower bottom. However, if the region to be blurred is enlarged further, the separating performance of the lens decreases. Hence, when the separating performance of the lens is designed preferentially, it is preferable that the lens curvature factor should be within a range where the following formula 25 or 26 is satisfied.

$$H \times L \times (n-1)/(L+2 \times X2)/n \leq r \leq H \times L \times (n-1)/(L+WX2)/n \quad \text{[Math 25]}$$

$$H \times L \times (n-1)/(L-WX2)/n \leq r \leq H \times L \times (n-1)/(L-2 \times X2)/n \quad \text{[Math 26]}$$

In the present exemplary embodiment, when the width of the inclined charging capacitor line CS in the X axis direction is WX2, as shown in FIG. 6, WX2=W2/sin θ1 is satisfied. In order to make the intersection between the charging capacitor line CS and the inclined side of the trapezoid compositely blurred, it is preferable that the spot size SP should be within a range from equal to or larger than WX1 and to equal to or smaller than 2×(WX2+X2). When the spot size SP is WX1, it is the limit that can make the inclined region of the trapezoidal aperture compositely blurred, and it is preferable that the spot size SP should be set to be larger than such a limit. When the spot size SP is 2×(WX2+X2), the region that can be blurred can be extended to the intersection between the charging capacitor line CS and the light blocking portion. Accordingly, the effect originating from the forming precision of the charging capacitor line CS is reduced in order to accomplish the improvement of the image quality. It is especially effective when the effect originating from the forming precision of the charging capacitor line CS to the image quality is large. However, if the blurring level increases more, the level of 3D crosstalk increases and it is not preferable. Hence, it is preferable to set the lens curvature to be within a range where the following formula 27 or 28 is satisfied.

$$H \times L \times (n-1)/(L+2 \times WX2+2 \times X2)/n \leq r \leq H \times L \times (n-1)/(L+WX1)/n \quad \text{[Math 27]}$$

$$H \times L \times (n-1)/(L-WX1)/n \leq r \leq H \times L \times (n-1)/(L-2 \times WX2-2 \times X2)/n \quad \text{[Math 28]}$$

Next, a detailed explanation will be given of the effect of the subpixel structure and that of the lens according to the present exemplary embodiment. First, the definition of 3D moire in the present exemplary embodiment will be explained.

Figure 15A:
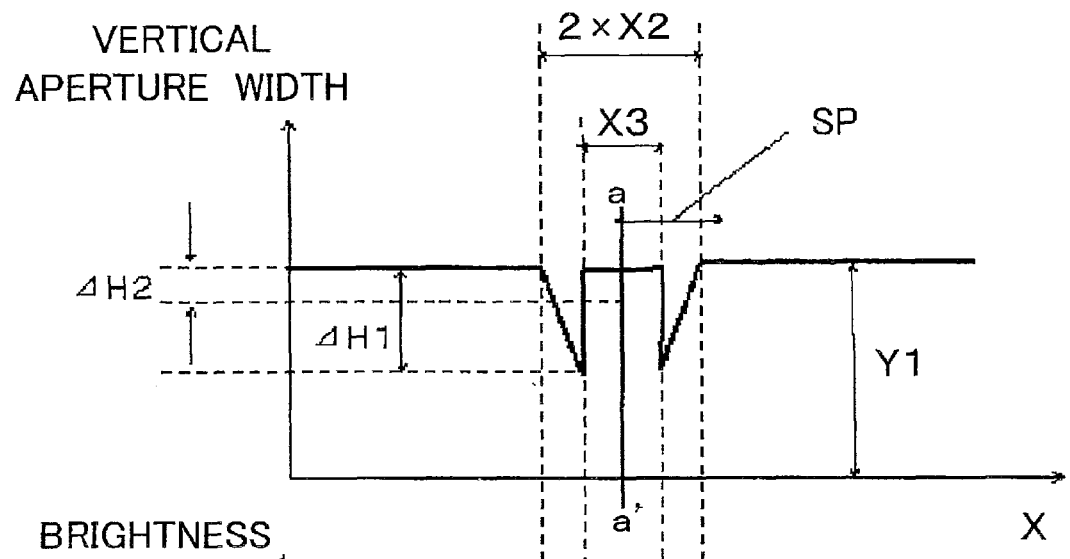
FIG. 15A is a chart showing the distribution of vertical aperture width in a subpixel according to the first exemplary embodiment of the present invention.
Figure 15B:
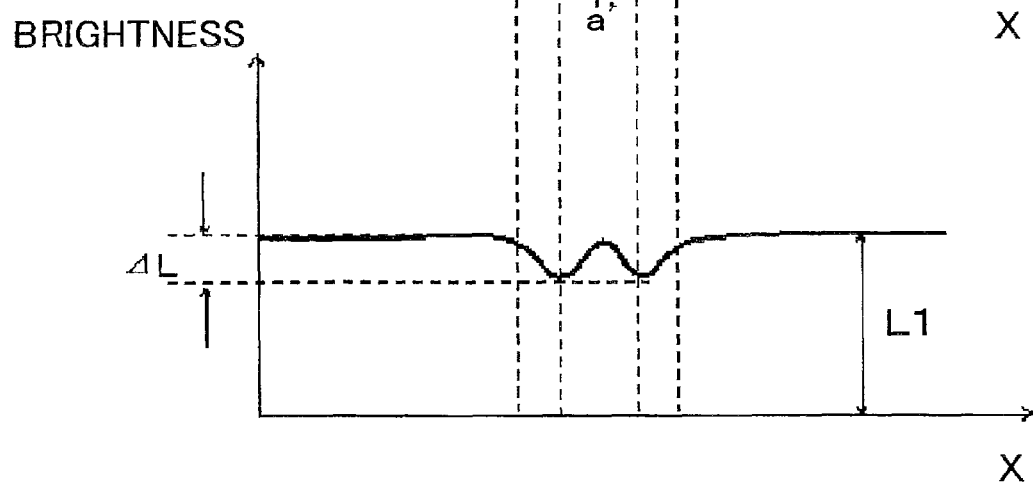
FIG. 15B is a chart showing the distribution of brightness in a subpixel according to the first exemplary embodiment of the present invention.
Figure 16:
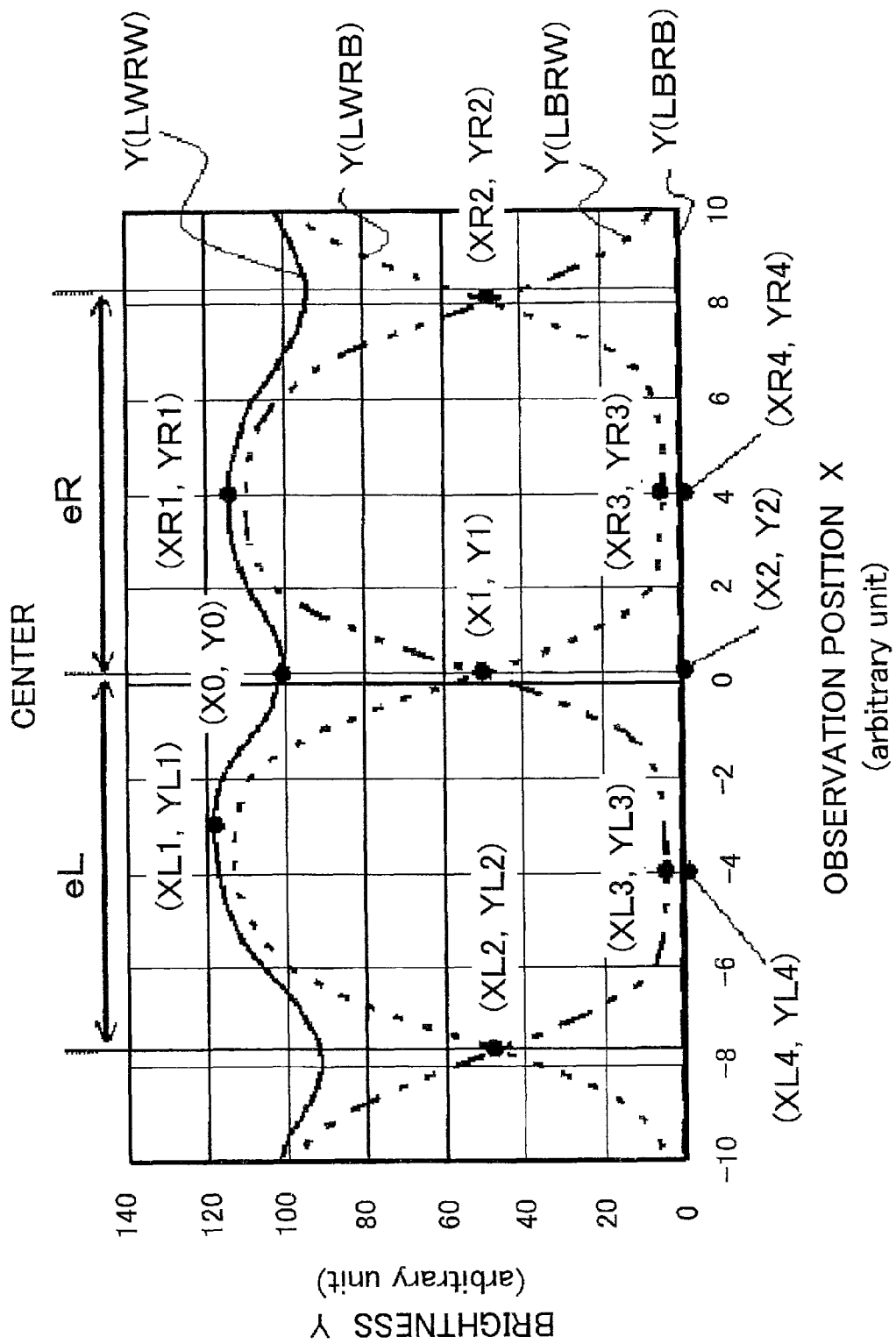
FIG. 16 is a graph showing an illustrative brightness distribution in the image display device according to the first exemplary embodiment of the present invention.

The image display device 1 according to the present exemplary embodiment has the distribution of vertical aperture width as shown in FIG. 15A, distribution of brightness as shown in FIG. 15B, and distribution of brightness as shown in FIG. 16. In FIG. 16, the observation position X on the abscissa presents the angle indicating the image separating direction; the direction perpendicular to the display surface, namely the Z axis direction being at 0 degree. The brightness Y on the ordinate presents relative brightness.

The −X side of the viewer position is a brightness distribution corresponding to an image output to the right-eye side, and the +X side is a brightness distribution corresponding to an image output to the left-eye side. A dotted line indicates a brightness distribution when an image is output by only one subpixel between the right-eye pixel 4R and the left-eye pixel 4L, and a thick line indicates a brightness distribution when images are displayed by both subpixels. Hence, the total of brightness distributions corresponding to respective view points indicated by the dotted line is equal to the brightness distribution indicated by the thick line.

The subpixels according to the present exemplary embodiment are designed so that the vertical aperture ratio in the image separating direction becomes substantially constant, but the vertical aperture ratio does not completely become constant because of the forming precision through a TFT producing process and a panel producing process, and the brightness may vary relative to the viewer position X. In particular, when the overlapping of the TFT substrate 2a and the opposing substrate 2b is largely misaligned in the Y axis direction, the brightness is likely to vary which is affected by the black matrix 60 that blocks light through the gate line G. A brightness fluctuation generated in the vicinity of (X0, Y0) is generated due to the light blocking portion of the gate line G. Such brightness fluctuation is called 3D moire, and in the present exemplary embodiment, is defined as follows.

$$YC=(YL1+YR1)/2 \quad \text{[Math 29]}$$

$$\Delta YC=(YC-Y0)/YC \quad \text{[Math 30]}$$

$$\Delta YC/\Delta XC=\Delta YC/(XR1-XL1) \quad \text{[Math 31]}$$

Moreover, a visually recognizable range eR of the right eye and a visually recognizable range eL of the left eye are defined as follows.

$$eR=XR4 \quad \text{[Math 32]}$$

$$eL=-XL4 \quad \text{[Math 33]}$$

Moreover, a following relationship is satisfied based on FIG. 6.

$$(XR3-XR1):(XL1-XR1)=X1:2\times X2 \qquad \text{[Math 34]}$$

The inventors of the present invention found in subjective assessment results that the display quality can be maintained without giving the viewer discomfort where the brightness fluctuation is within 20%. Therefore, it is desirable that the vertical aperture ratio at the line A-A' in FIG. 6 is designed to keep fluctuation in the vertical aperture ratio within 20% and the following relationship is satisfied.

$$0.8<(Y1-W1/\cos\theta)/Y1<1.2 \qquad \text{[Math 35]}$$

The image display device 1 as described above has the subpixels 4S in which the data line D, gate line G, charging capacitor electrode CS2, and switching means are efficiently placed, ensuring higher stereoscopic image quality while improving the aperture ratio.

Furthermore, in the image display device 1, the switching element and subpixels 4S are connected so that an adjoining pixel pair 4PAIR is a basic unit for driving. The charging capacitor electrode CS2 of an adjoining pixel pair 4PAIR is electrically connected to a region shared by the subpixels 4S constituting the adjoining pixel pair 4PAIR. Then, the image display device 1 according to the present exemplary embodiment can reduce fluctuation in the potential of the charging capacitor electrode CS2 of an adjoining pixel pair 4PAIR, reducing flickers and crosstalk.

Furthermore, the image display device 1 according to the present exemplary embodiment has the black matrix 60 covering the gate line G or charging capacitor line CS at least in part, increasing the margin of production process and improving the yield. Moreover, fluctuation in the brightness around the axis of the optical unit due to production process can be reduced, improving the stereoscopic image quality.

Furthermore, in the image display device 1 according to the present exemplary embodiment, the charging capacitor line CS electrically connected to the charging capacitor electrode CS2 is situated close to the gate line G at least in part. Then, the electric field components leaking from the gate line G into the liquid crystal layer is blocked and defective orientation and/or disclination of the liquid crystal molecules can be reduced. Consequently, the transmission profile of the liquid crystal layer at the aperture can be uniform and uneven brightness caused by the optical unit distributing light in a given direction can be reduced.

Modified Embodiment of First Exemplary Embodiment

In the present exemplary embodiment, the numbers of gate lines G and data lines D are limited to those necessary for the explanation for easier understanding. However, the present exemplary embodiment is not confined thereto and there is no influence on the nature of the present invention.

In the present exemplary embodiment, the pixel thin-film transistor 4TFT becomes conductive between the source electrode and the drain electrode when the potential at the gate electrode becomes a low level relative to the potential of the source electrode or the drain electrode. Conversely, a so-called NMOS thin-film transistor may be used which becomes conductive when the potential at the gate electrode becomes a high level relative to the potential of the source electrode or the drain electrode.

In the present exemplary embodiment, the contact holes 4CONT1 and 4CONT2 of the pixel are arranged and shifted from the center of the pixel in the X axis direction. The view point of the viewer is highly possibly arranged in the vicinity of the center of the pixel when enlarged projection is performed on the viewing plane by the image separating unit like the lens. When the contact holes 4CONT1 and 4CONT2 are arranged in the vicinity of the center of the pixel, the orientation of liquid crystal molecules are disturbed which may negatively affect a display operation. Accordingly, if the contact holes 4CONT1 and 4CONT2 are arranged in the vicinity of the center of the subpixel, the display quality may be deteriorated at a location best for a viewing. Hence, like the present exemplary embodiment, by arranging the contact holes 4CONT1 and 4CONT2 so as to be shifted from the proximity of the center of the subpixel, the improvement of the display quality is enabled. Moreover, when respective subpixels configuring the adjoining pixel pair are arranged so as to be symmetrical around about a point, it is possible to prevent respective X axis coordinates of the contact holes 4CONT1 and 4CONT2 from being coincident with each other. In this way, influence of multiple contact holes does overlap at the same point on the viewing plane, thereby improving the image quality.

In the present exemplary embodiment, the explanation was given of the case in which respective subpixels of each of the adjoining pixel pairs 4PAIR are arranged so as to be symmetrical around a point. This means that respective positions of the pixel thin-film transistors 4TFT of respective subpixels configuring the adjoining pixel pairs 4PAIR are symmetrical relative to the center line in the X axis direction of the adjoining pixel pairs 4PAIR and 4PAIR2. The present invention is not limited to this configuration, and for example, respective positions of the thin-film transistors 4TFT of respective pixels of the adjoining pixel pairs may be asymmetrical in the X axis direction. This allows respective subpixels to have a change in the position of the thin-film transistor, so that the plurality of thin-film transistors are prevented from having redundant effects at the same position on the viewing plane, thereby improving the image quality.

Furthermore, in the present exemplary embodiment, the black matrix 60 as the light blocking layer within the opposing substrate 2b is larger than the line width of subpixels on the TFT substrate 2a in consideration of misalignment between the opposing substrate 2b and TFT substrate 2a. That is, the light blocking layer covering a subpixel other than the aperture thereof formed by the wiring on the TFT substrate 2a may be formed. The light blocking layer may cover at least a part of the aperture of the pixel, and an aperture formed by the light blocking layer and the aperture of the pixel may be in a similar shape. Moreover, the aperture formed by the light blocking layer may be smaller than the aperture of the pixel. This suppresses a change in the aperture shape even if the TFT substrate 2a and the opposing substrate 2b are misaligned, thereby improving the image quality.

The connection relationship among the gate line G, the data line D and the subpixel in the present exemplary embodiment can be expressed as follows. That is, a subpixel column sandwiched between any two of the plurality of data lines D has a subpixel connected to one data line D through a pixel switch and another subpixel connected to another data line D through a pixel switch alternately arranged, and a subpixel row sandwiched between any two of the plurality of gate lines G has a subpixel connected to one gate line D through a pixel switch and another subpixel connected to another gate line G through a pixel switch alternately arranged. In order to employ such arrangement, it is preferable that the number of the data lines D arranged should be larger than the number of pixel rows by one. Likewise, it is preferable that the number of gate lines G arranged should be larger than the number of pixel columns by one.

The explanation was given of the case in which the lenticular lens 3 has a lens surface arranged on the +Z direction plane that is the direction toward the user. The present invention is, however, not limited to this configuration, and the lens surface may be arranged on the −Z direction plane that is the direction toward the display element. In this case, a distance between the lens and the pixel can be reduced, so that this configuration is advantageous for high-definition imaging.

The unit of display 4U may be formed in a square. The expression forming in a square means that the pitch of the unit of display 4U in the X axis direction for N view points, Pu=N×Px, is coincident with the pitch thereof in the Y axis direction, Py. In other words, in a direction in which the units of display 4U are repeatedly arranged, the pitch thereof remains same at all.

The above explanation was for a technique of setting a plurality of view points on a viewing plane and of causing subpixels for respective view points to emit light toward respective set view points from all units of display 4U. This technique is called a light collecting technique because light for a certain view point is collected toward that view point. The light collecting technique is classified into the above-explained two-view-point type stereoscopic image display device and a multi-view-point type stereoscopic image display device having the number of view points increased more. FIG. 17 is a conceptual diagram showing a light collecting technique. As shown in FIG. 17, the lines 17 presenting the center axis of image separation gather at the view point of the viewer and the viewer can view independent images with the right and left eyes. The light collecting technique has a feature that light beam entering into the eye of the viewer is reproduced and displayed. The image display device 1 of the present exemplary embodiment can be effectively applied to the light collecting technique.

Furthermore, so-called spatial image technique, spatial image regenerating technique, spatial image reproducing technique, and spatial image forming technique are proposed. FIG. 18 is a conceptual diagram of a spatial image technique. Unlike the light collecting technique, the spatial image technique does not have a specific view point. However, what is different is that light emitted from a spatial object is reproduced and displayed. The spatial image technique is classified into stereoscopic image display devices through an integral photography technique, an integral videography technique, and an integral imaging technique. According to the spatial image technique, a viewer located at an arbitrary position does not view only an image for the same view point over the whole display plane. However, there are plural kinds of regions with a predetermined width formed by pixels for the same view point. The image display device 1 of the present exemplary embodiment can yield the same effect as that of the light collecting technique at each region, so that the image display device 1 of the present exemplary embodiment can be effectively applied to the spatial image technique.

In the above explanation, a term "view point" means a "position where the image display device is viewed (an observation position)" or a "point or a region where the eye of the viewer should be positioned", not a "point on a display region where the viewer pays attention (a viewing point)".

The polarization plate 11 can be applied to a side of the lenticular lens 3 instead of being applied to the display element 2 mounted in the image display device 1 according to the present exemplary embodiment. Furthermore, the polarization plate 11 can be provided for the lenticular lens 3 on the side closer to the viewer. With the polarization plate 11 positioned differently, the distance H between the vertex of the lens and the subpixels can be adjusted in a simple manner. Consequently, the freedom of design can be improved. Furthermore, the image separating unit mounted in the image display device 1 according to the present exemplary embodiment is not restricted to the lenticular lens 3 and can be a parallax barrier consisting of alternate transparent and non-transparent regions. The parallax barrier can be an electro-optical element in which the transparent and nontransparent regions are switched by liquid crystal molecules or a MEMS shutter. Furthermore, the effects of the present exemplary embodiment can be obtained by using a GRIN (gradient index) lens, a liquid crystal-based electro-optical element, as the image separating unit.

The liquid crystal display element of the image display device 1 of the present exemplary embodiment is not limited to the liquid crystal driving scheme of the TN mode, and other liquid crystal driving modes can be applied. Examples of the liquid crystal driving modes in the horizontal electric field mode are an IPS (in-plain switching) scheme, an FFS (fringe field switching) scheme, and an AFFS (advanced fringe field switching) scheme. Moreover, in the case of the vertical orientation mode, examples are an MVA (multi-domain vertical alignment) scheme with a multi-domain so that a viewing angle dependency is reduced, a PVA (patterned vertical alignment) scheme, and an ASV (advanced super v) scheme. Furthermore, liquid crystal display elements of an OCB (optically compensated bend) scheme and a film compensation TN mode can be appropriately used.

The explanation was given of the case in which the display element 2 of the present exemplary embodiment is a liquid crystal display element utilizing the liquid crystal molecules as the electrooptic elements. The display element 2 is not limited to the transparent liquid crystal display element, but can be a reflective liquid crystal display element, a semitransparent liquid crystal display element, a slightly reflective liquid crystal display element having a larger ratio of a transparent region than that of a reflective region, and a slightly transparent liquid crystal display element having a larger ratio of a reflective region than that of a transparent region, etc. Moreover, a TFT scheme can be appropriately applied as the driving scheme for the display element 2. Thin-film transistors in the TFT scheme can be formed of not only an amorphous silicon, a low-temperature poly-silicon, a high-temperature poly-silicon, and a single-crystal silicon, but also an organic material like pentacene, a metal oxide like zinc oxide, or carbon nanotubes. Moreover, the display element 2 of the present exemplary embodiment is not limited to the particular structure of the thin-film transistor. For example, a bottom-gate type, a top-gate type, a stagger type, or a reverse stagger type can be appropriately applied.

Furthermore, the display element 2 can be a display element that is not of a liquid crystal type, such as an organic electroluminescence display element and PALC (plasma address liquid crystal). In an organic electroluminescence display element, the non-light emitting region serves as the light blocking region. Application of the structure of the light blocking portion of the present exemplary embodiment to the non-light emitting region can lead to the same effect.

In the present exemplary embodiment, a cellular phone is exemplified as the terminal device, but the present invention is not limited to this type of terminal device. For example, the present invention can be applied to various portable terminal devices, such as a PDA, a personal TV, a gaming machine, a digital camera, a digital video camera, and a laptop computer. Moreover, the present invention is not limited to the portable terminal device, but can be applied to various fixed-type terminal devices, such as a cash dispenser, an automatic vending machine, a monitor, and a television receiver.

Second Exemplary Embodiment

An image display device according to the present exemplary embodiment will be described hereafter.

Figure 19:
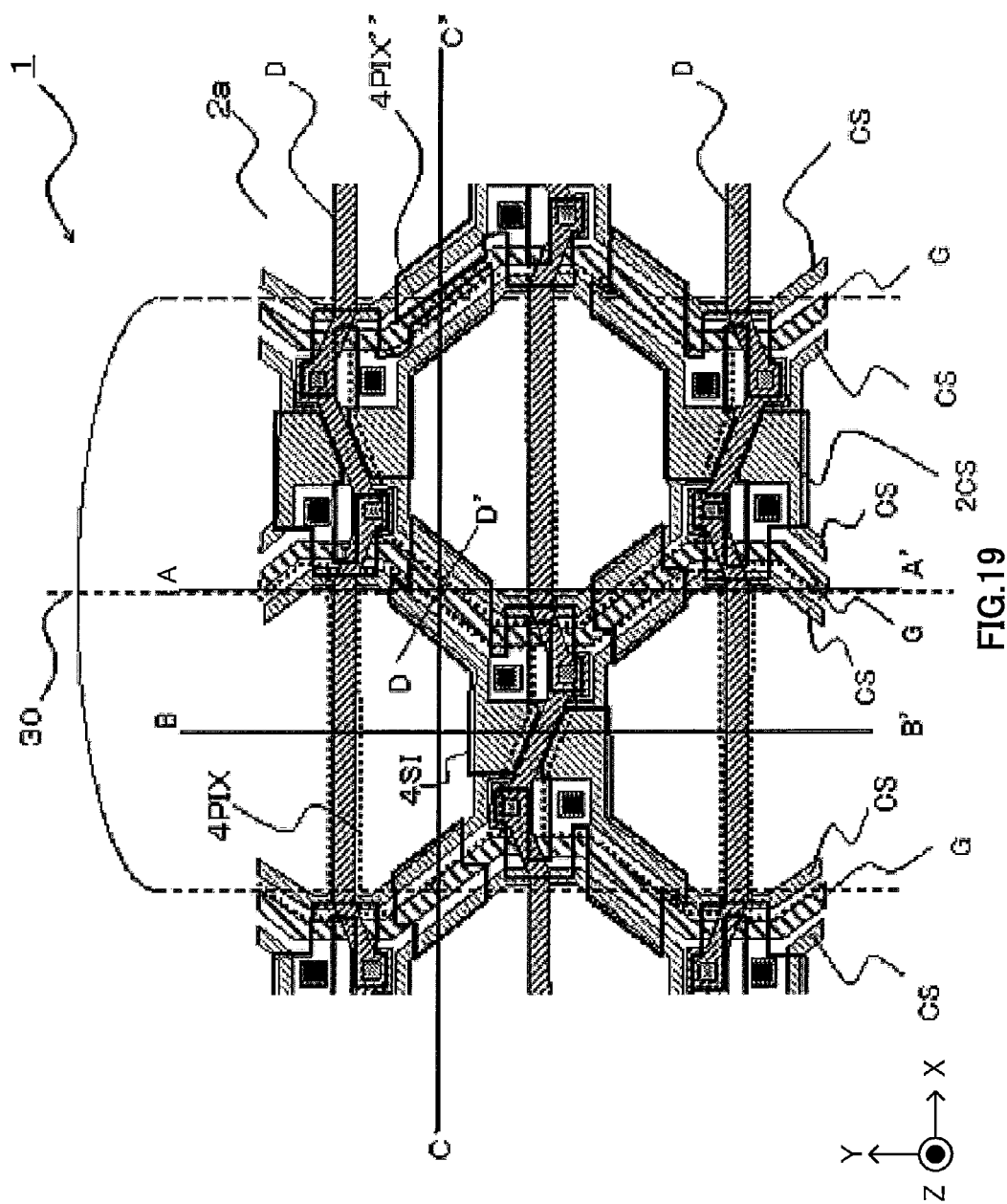
FIG. 19 is a plan view showing a subpixel of the image display device according to the second exemplary embodiment of the present invention.
Figure 20:
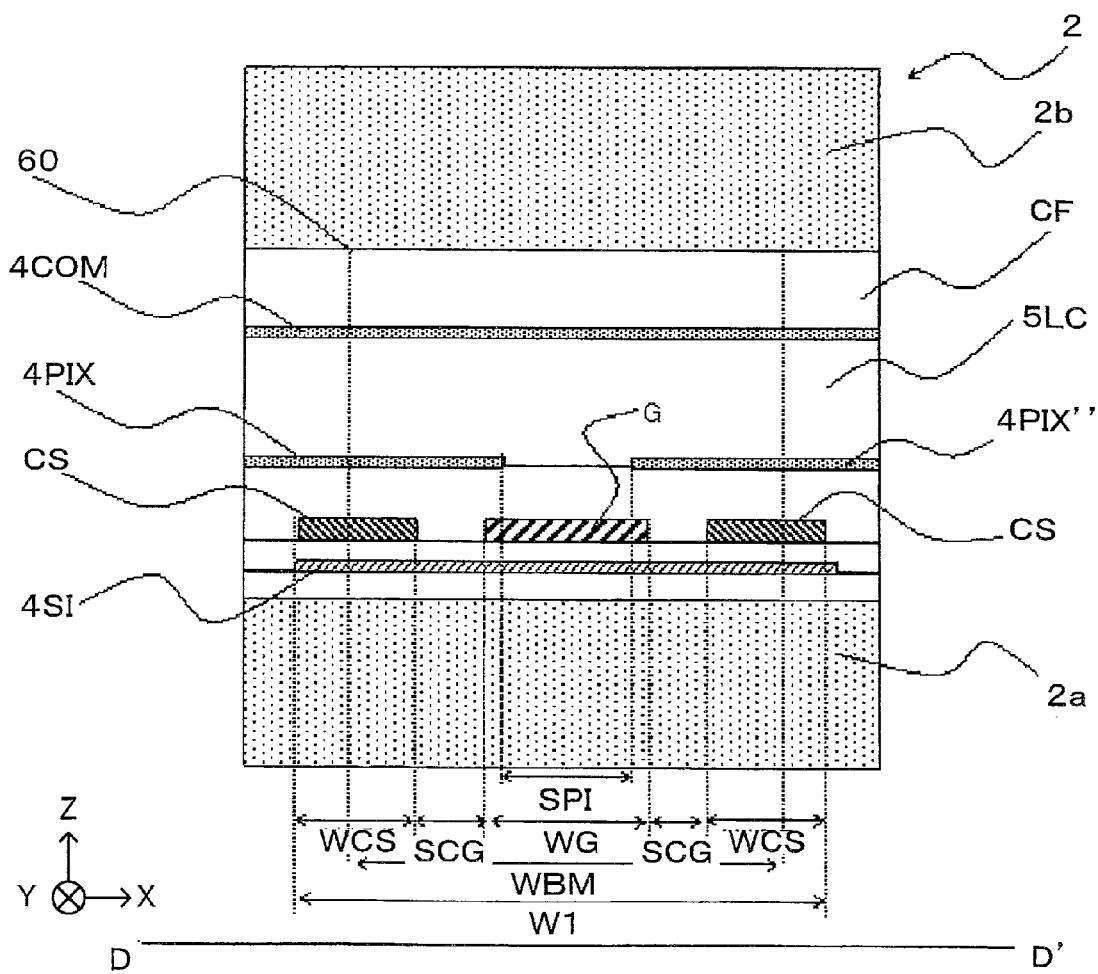
FIG. 20 is a cross-sectional view showing the inclined wiring in a subpixel according to the second exemplary embodiment of the present invention.

In an image display device 1 according to the present exemplary embodiment, as shown in FIGS. 19 and 20, charging capacitor lines CS are provided on either end of a gate line G. In other words, two charging capacitor lines CS electrically connected to the charging capacitor electrode CS2 are provided in a subpixel 4S.

The image display device 1 according to the present exemplary embodiment is the same in the other structure and drive method as the above-described first exemplary embodiment.

The image display device 1 according to the present exemplary embodiment is provided with two charging capacitor lines CS. Therefore, if one of the charging capacitor lines CS is disconnected due to some process defect, the other can electrically be connected to the charging capacitor electrode CS2 and serve as a wire. Consequently, failure of the charging capacitor line CS due to disconnection can be reduced and the yield can be improved.

Furthermore, the image display device 1 according to the present exemplary embodiment has the charging capacitor lines CS on either side of a gate line G, blocking the electric field leaking from the gale line G. Consequently, defective orientation and/or disclination caused by the electric field from the gate line G at the subpixel aperture can be reduced. Particularly, in the case of normally black mode, such defective orientation and/or disclination can cause leaking light. Then, the above configuration can improve the contrast. Furthermore, leaking light at a particular position of the subpixel aperture is enlarged by the image separating unit and viewed as periodic unevenness. Then, the above configuration can be used to improve the stereoscopic image quality.

Third Exemplary Embodiment

An image display device according to the present exemplary embodiment will be described hereafter.

Figure 21:
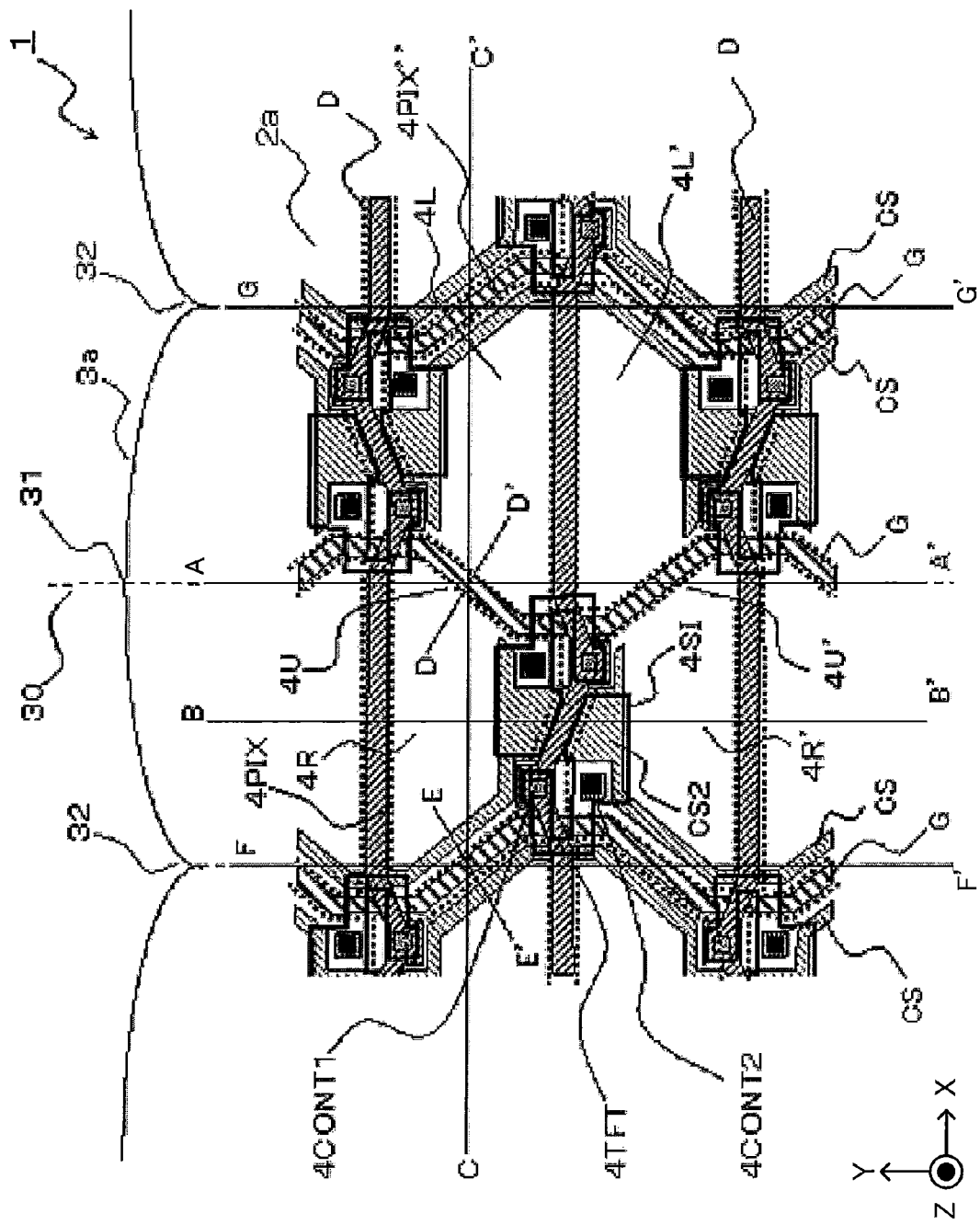
FIG. 21 is a plan view showing a subpixel of the image display device according to the third exemplary embodiment of the present invention.

In an image display device 1 according to the present exemplary embodiment, as shown in FIG. 21, the gate line G is provided at the lens convex part 31 of a lenticular lens 3 and the gate line G and charging capacitor line CS are provided at the lens trough part 32 of the lenticular lens 3.

Here, the optical axis 30 of the lens convex part 31 is referred to as the first axis and a virtual line extending through the lens trough part 32 in the longitudinal direction is referred to as the second axis. As shown in FIG. 21, the center line A-A' of a unit of display 4U in the X axis direction nearly coincides with the first axis. Line segments F-F' and G-G' that are the borderlines between units of display 4U adjacent to each other in the X axis direction nearly coincide with the second axis.

A gate line G inclined in a direction different from the image separation direction crosses the first axis at the lens convex part 31. Two charging capacitor lines CS and a gate line G between them, which are inclined in a direction different from the image separation direction, cross the second axis at the lens trough part 32.

Figure 22:
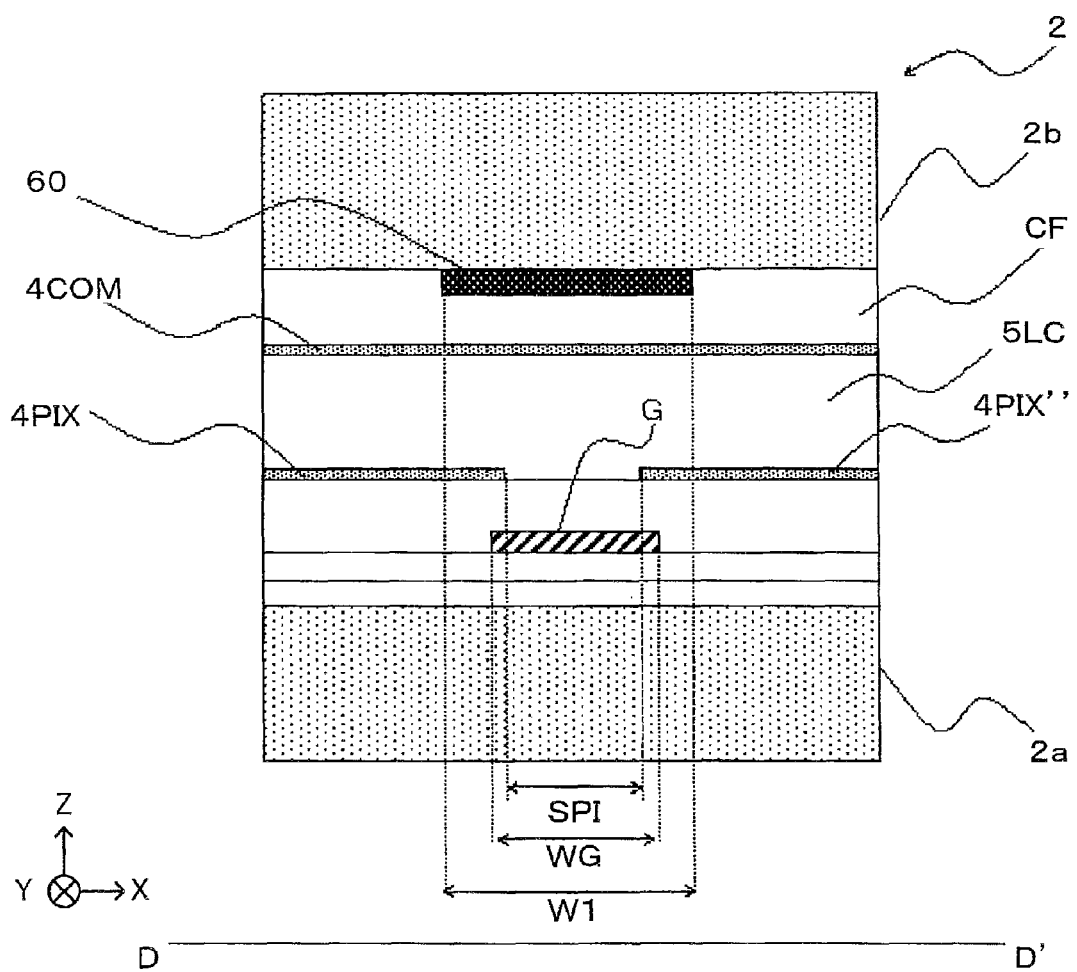
FIG. 22 is a cross-sectional view showing the inclined wiring in a subpixel according to the third exemplary embodiment of the present invention.
Figure 23:
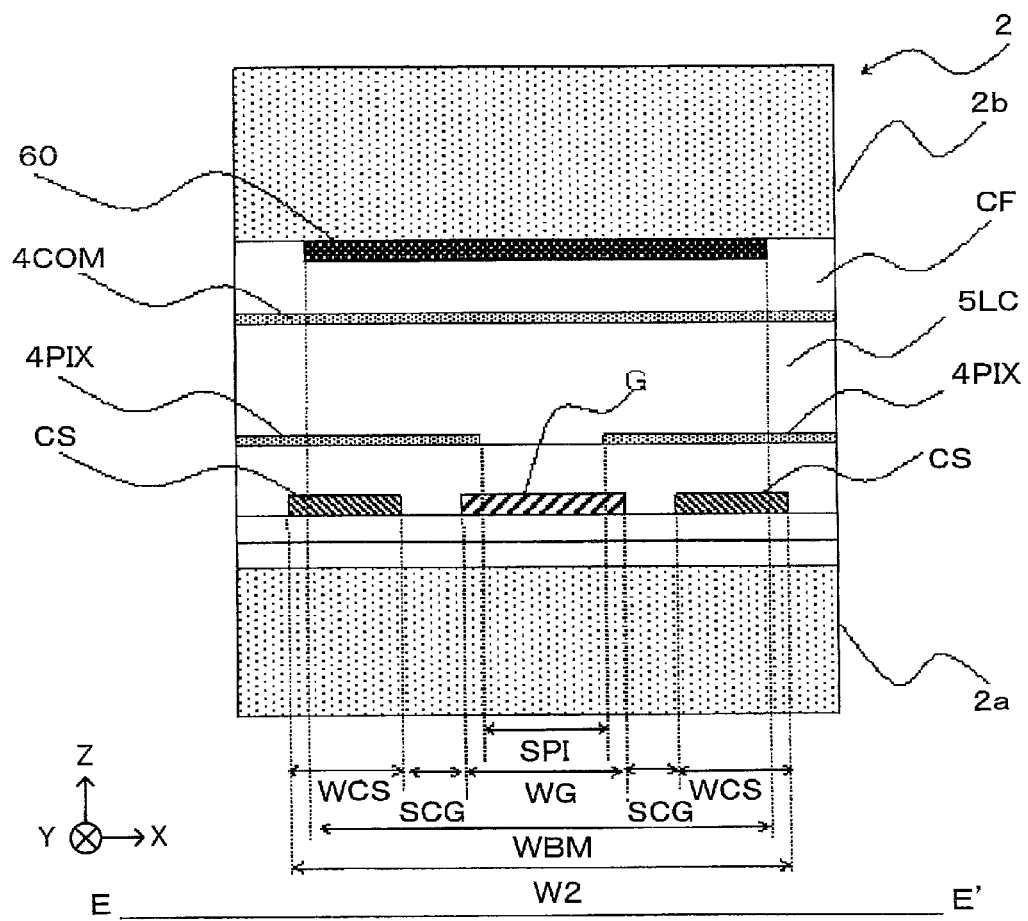
FIG. 23 is a cross-sectional view showing the inclined wiring in a subpixel according to the third exemplary embodiment of the present invention.

In cross-sectional views, the gate line G at the line segment D-D' is provided as shown in FIG. 22 and the gale line G at the line segment E-E' is provided as shown in FIG. 23.

The image display device 1 according to the present exemplary embodiment is the same in the other structure and drive method as the above-described first exemplary embodiment.

The line A-A' in FIG. 21 is the borderline between right-eye and left-eye pixels 4R and 4L. The 3D moire caused by such part is a problem with the viewer as a sense of discomfort. In the image display device 1 according to the present exemplary embodiment, the inclined wire on the first axis can be narrowed, whereby the 3D moire at the border between right-eye and left-eye pixels 4R and 4L can effectively be suppressed.

Modified Embodiment of Third Exemplary Embodiment

A modified embodiment according to the present exemplary embodiment will be described hereafter.

Figure 24:
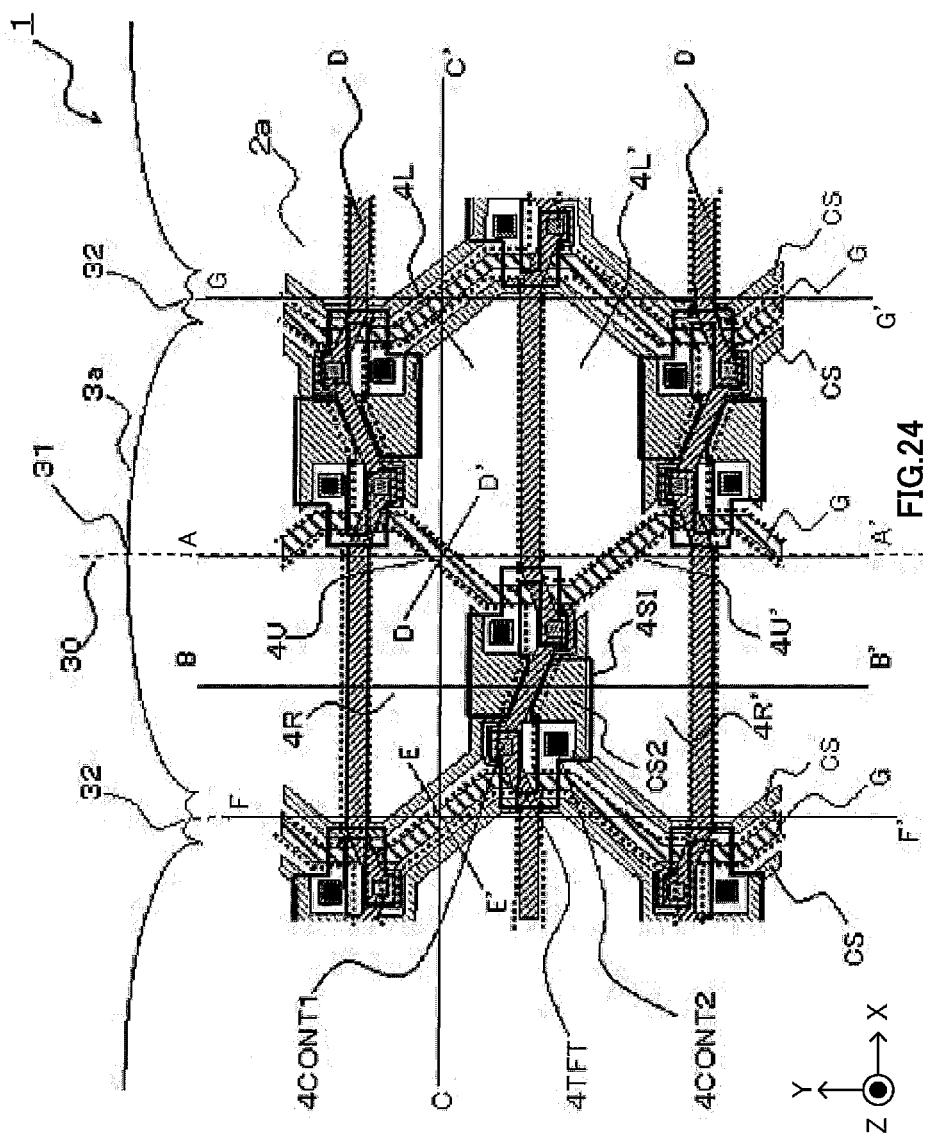
FIG. 24 is a plan view showing a subpixel of the image display device according to a modified embodiment of the third exemplary embodiment of the present invention.
Figure 25:
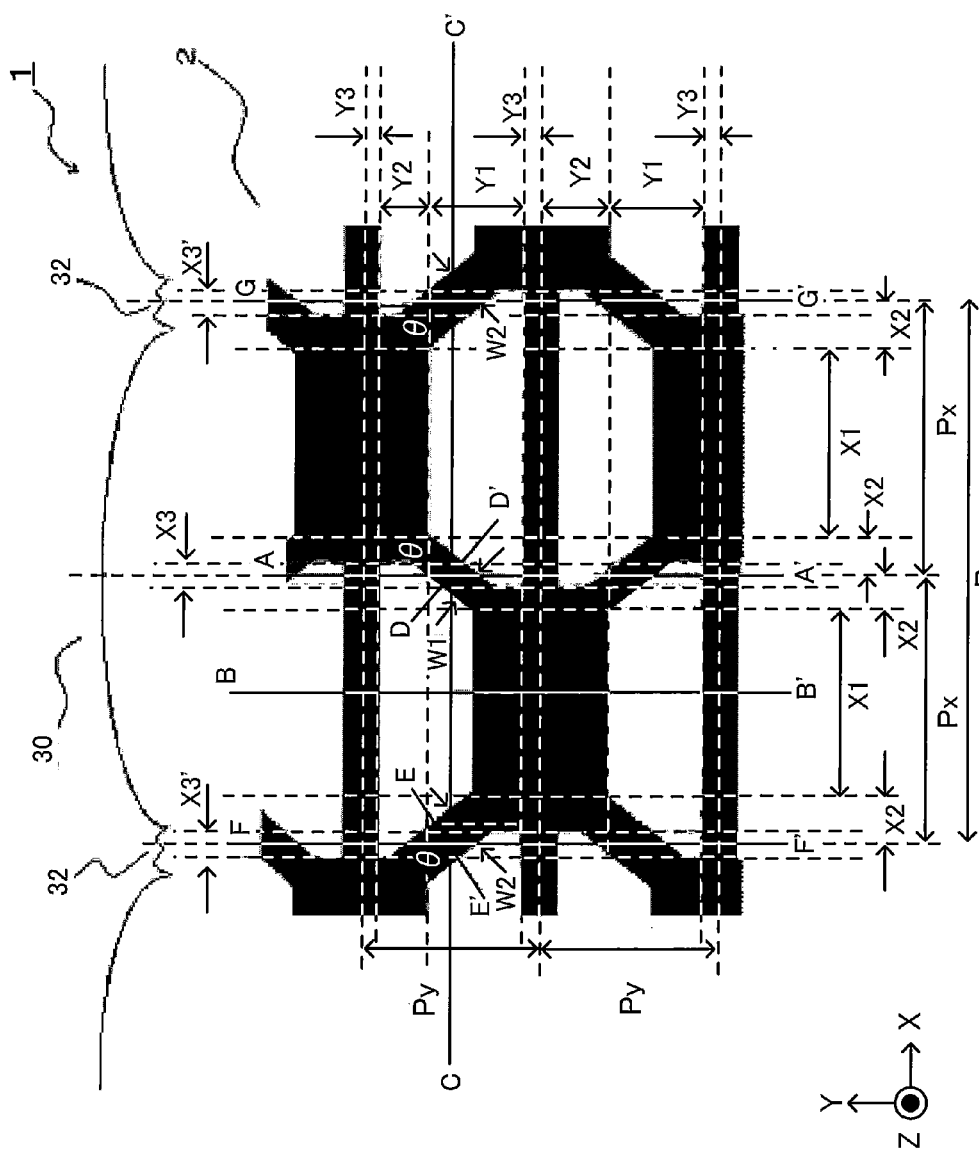
FIG. 25 is a plan view showing the black matrix of the image display device according to the modified embodiment of the third exemplary embodiment of the present invention.

The lenticular lens 3 of an image display device 1 according to the present exemplary embodiment is characterized in that the lens trough part 32 is processed with lower accuracy than the lens convex part 31 as shown in FIGS. 24 and 25 and the lens trough part 32 has low optical separation performance.

The image display device 1 according to the present exemplary embodiment is the same in the other structure and drive method as the above-described first exemplary embodiment.

By the way, for producing a lenticular lens, techniques such as molding using a die, photolithography, and inkjet can generally be used. With any technique, a given shape is ensured more in the lens convex part of a cylindrical lens than in the trough part between adjacent cylindrical lenses. The lens convex part has higher optical performance. It is more difficult to remove residues after peel-off and adherent foreign substances from the lens rough part than from the lens convex part. This causes the lens trough part to have lower optical separation performance. Furthermore, a small spot diameter on the first axis contributes to high separation performance while a large spot diameter on the second axis contributes to low separation performance, leading to significant defocusing.

When the optical unit is a GRIN (gradient index) lens as a liquid crystal-based electro-optic element, variation in the refractive index is larger in the lens trough part than in the lens convex part. As in the case of a lenticular lens, the optical separation performance is lower at the lens trough part. Besides a GRIN lens, also in the case of a liquid crystal lens consisting of a combination of a concave-convex substrate having a lens effect and liquid crystal molecules, a steep convex shape at the lens trough part of the concave-convex substrate tends to cause the optical separation performance to deteriorate.

Figure 26:
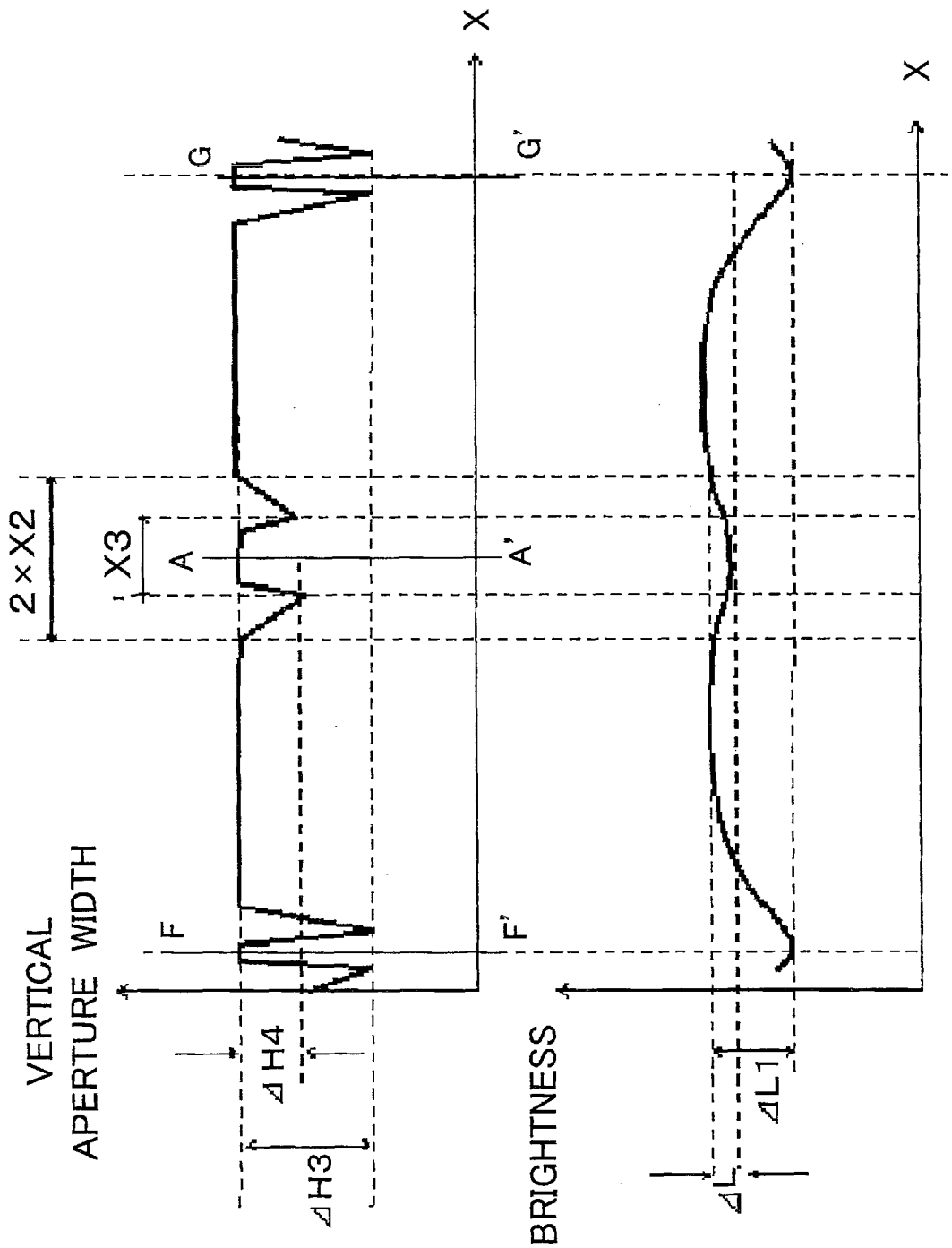
FIG. 26A is a chart showing the distribution of vertical aperture width of the image display device according to the third exemplary embodiment of the present invention.
FIG. 26B is a chart showing the distribution of brightness of the image display device according to the third exemplary embodiment of the present invention.

The image display device 1 according to the present exemplary embodiment yields the distribution of vertical aperture width and distribution of brightness as shown in FIG. 26. As seen from those distributions, the optical separation performance on the lens axis at the lens convex part 31 is high; therefore, 3D moire and 3D crosstalk are balanced to improve the stereoscopic display performance.

In the present exemplary embodiment, in order to address the problem with the above-explained optical unit, the inclined wire is smaller at the convex part; then, light emitted from a subpixel 4S is assigned to the lens convex part 31 having higher optical separation performance. Consequently, light can be used efficiently and the transmissivity can be improved. Furthermore, 3D moire can be reduced so as to improve the stereoscopic image quality.

Fourth Exemplary Embodiment

An image display device according to the present exemplary embodiment and a driving method thereof will be described hereafter.

The image display device 1 according to the present exemplary embodiment can be driven, as shown in FIG. 27, by dot inversion driving (2H1V inversion driving) as in the first exemplary embodiment. The driving method of the image display device 1 according to the present exemplary embodiment is different from that of the first exemplary embodiment in the display data transfer method.

Figure 28:
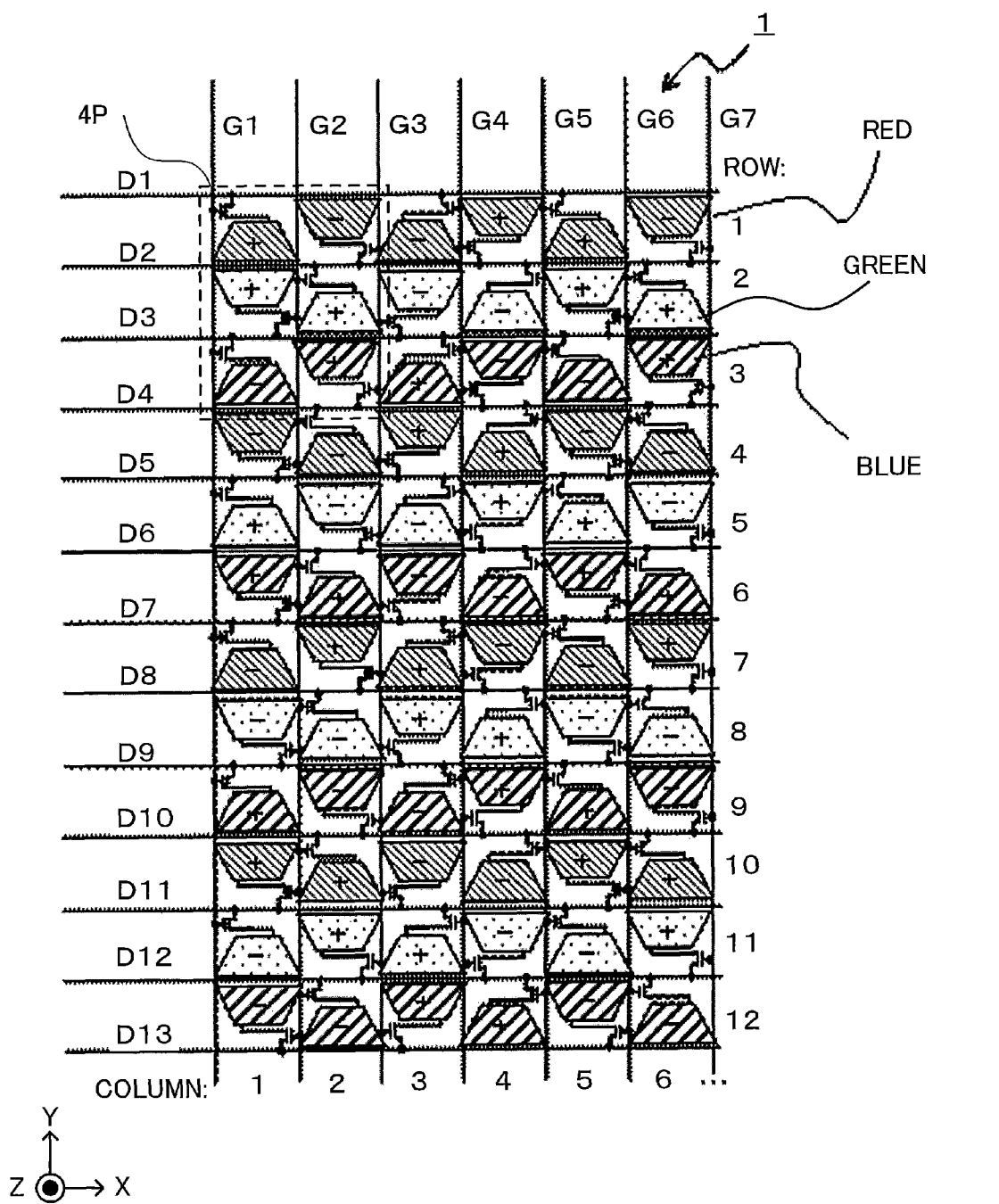
FIG. 28 is a schematic illustration showing the polarity of subpixels of the image display device according to the fourth exemplary embodiment of the present invention.
Figure 29:
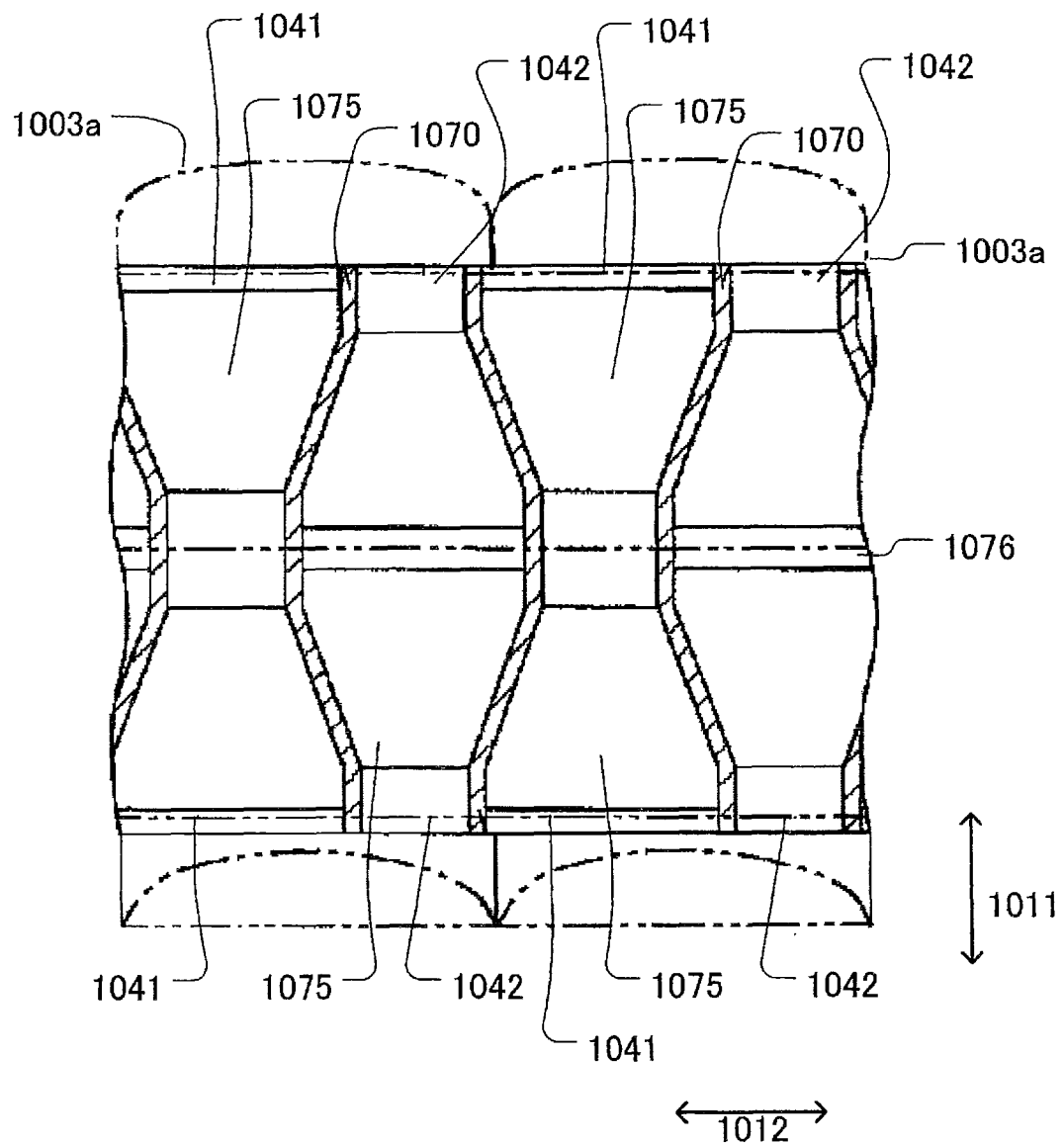
FIG. 29 is a plan view showing the display element of a prior art stereoscopic image display device.
Figure 30:
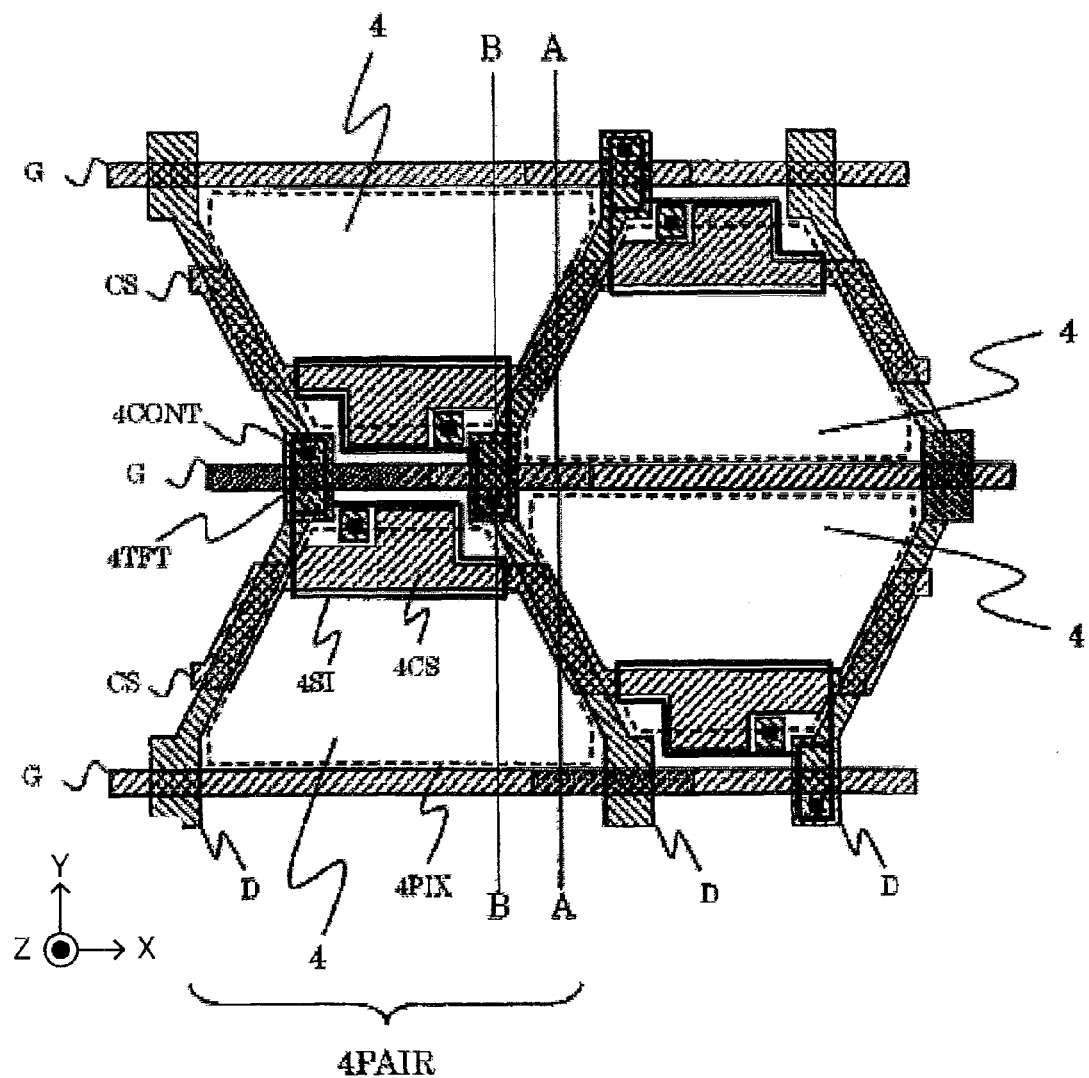
FIG. 30 is a plan view showing the display element of a prior art stereoscopic image display device.

The image display device 1 realizes the polarities of subpixels as shown in FIG. 28 in a given frame as a result of 2H1V inversion driving. First, when a gate line G1 is selected, display data with a positive polarity is transmitted to a data line D1, and a voltage with a positive polarity is written in a pixel P11. Moreover, pieces of display data with a negative polarity are transmitted to data lines D2, D3, D6, D7, D10 and D11, respectively, and pieces of display data with a positive polarity are transmitted to data lines D4, D5, D8, D9, D11, and D12, respectively. Next, when a gate line G2 is selected, all polarities of data lines D are inverted. That is, pieces of display data with a negative polarity are transmitted to the data lines D1, D4, D5, D8, D9, D11, and D12, respectively, and pieces of display data with a positive polarity are transmitted to the data lines D2, D3, D6, D7, D10, and D11, respectively. Thereafter, when gate lines G3, G5, and G7 are selected, respectively, the same state is applied like when the gate line G1 is selected, and when gate lines G4 and G6 are selected, respectively, the same state is applied like when the gate line G2 is selected. When this frame ends, in a next frame, polarity inversion is further performed. That is, when the gate lines G1, G3, G5, and G7 are selected, respectively, pieces of display data with a negative polarity are transmitted to the data lines D1, D4, D5, D8, D9, D11, and D12, respectively, and pieces of display data with a positive polarity are transmitted to the data lines D2, D3, D6, D7, D10, and D11, respectively. Moreover, when the gate lines G2, G4, and G6 are selected, respectively, pieces of display data with a positive polarity are transmitted to the data lines D1, D4, D5, D8, D9, D11, and D12, respectively, and pieces of display data with a negative polarity are transmitted to the data lines D2, D3, D6, D7, D10, and D11, respectively.

Electrically connected to a charging capacitor electrode CS2 through the charging capacitor lines CS are pixels P11, P32, P31, P52, P51, P72, P71, P92, P91, P112, P111, and P132. Regarding such a subpixel group, the written subpixels when the gate line G1 is selected are the subpixels P11, P31, P51, P71, P91, and P111, and in a frame in the selected subpixels, subpixels where display data with a positive polarity is written are P11, P51, and P91, and subpixels where display data with a negative polarity is written are P31, P71, and P111. Thereafter, in a next frame period, the subpixels selected by the gate line G1 invert respective polarities. Hence, regarding writing of display data to respective subpixels in a period in which a gate line G is selected, the common charging capacitor electrode CS2 is connected to not only subpixels where display data with a positive polarity is written but also subpixels where display data with a negative polarity is written, and display data with a positive polarity and display data with a negative polarity are written uniformly in a balanced manner.

Here, with the above relation of electrical connection, as shown in FIGS. 3 and 4, the adjoining pixel pairs 4PAIR1 and 4PAIR2 can be arranged in any combination to configure a pixel wiring layout.

The image display device 1 according to the present exemplary embodiment is the same in the other structure and drive method as the above-described first exemplary embodiment.

In the image display device 1 of the present exemplary embodiment, when display data is written in each subpixel in a scan period, the fluctuation of the potential of the charging capacitor line CS can be suppressed. This is because each charging capacitor line CS is connected to not only subpixels where display data with a positive polarity is written but also subpixels where display data with a negative polarity is written. Accordingly, it is possible to prevent the potential of the charging capacitor line CS to fluctuate toward a polarity at one side, and crosstalk generated in a direction in which the charging capacitor line CS extends can be reduced, thereby realizing a high-quality display.

The configuration of the image display device 1 according to the present exemplary embodiment can realize the two-line dot inversion effect and the potential fluctuation suppressing effect of each charging capacitor line CS while utilizing a general inversion driving technique, and can cause the pixels adjoining at the bottom portion of the trapezoidal aperture to have the same polarity. Hence, a high-quality image display can be realized at a low cost.

The present invention can be changed and modified in various forms without departing from the broad scope and spirit of the present invention. Moreover, the above-explained exemplary embodiments are for explaining the present invention and not for limiting the scope and spirit of the present invention. That is, the scope and spirit of the present invention are indicated by appended claims rather than the exemplary embodiments. Various changes and modifications within the scope and spirit of the present invention and equivalent thereto should be within the scope and spirit of the present invention.

Some or all of the above-explained exemplary embodiments can be expressed like following additional remarks, but the present invention is not limited to the following additional remarks.

<Additional Remark 1>

An image display device, comprising:

a display element comprising subpixels and on which multiple units of display including at least the subpixel displaying a first view point image and the subpixel displaying a second view point image are arranged in a matrix; and an optical distributer for distributing light emitted from the first view point subpixel and second view point subpixel in a first direction, wherein the optical distributer has an optical axis parallel to a second direction orthogonal to the first direction;

the subpixels each comprise a switcher for transferring display signals for displaying images, and a charging capacitor electrode forming capacitance;

the display element comprises data lines extended in the first direction and supplying the display signals, gate lines extended in the second direction and controlling the switcher, and charging capacitor lines extended in the second direction and electrically connecting the charging capacitor electrodes in the second direction;

the switcher of one of a pair of subpixels facing each other via one of the data lines is connected to the data line and gate line;

the switcher of the other of the pair of subpixel is connected to the same data line as the one of the pair of subpixel and a different one of the gate lines from the one of the pair of subpixel;

the charging capacitor electrode and an electrode of the switcher of each subpixel of the pair of subpixels are electrically equally connected;

at least one portion of the gate lines is inclined to cross the optical axis in a direction different from said second direction; and at least one portion of the charging capacitor lines is provided along the gate lines.

<Additional Remark 2>

The image display device according to Additional Remark 1, wherein:

the charging capacitor electrode of one subpixel of the pair of subpixels and the charging capacitor electrode of the other subpixel are integrally formed; and the data line is inclined in a direction different from the first direction at the part where the charging capacitor electrode or charging capacitor line crosses the data line in a plane view.

<Additional Remark 3>

The image display device according to Additional Remark 1, wherein:

the pair of subpixels adjacent to each other in the first direction are connected to different ones of the data lines.

<Additional Remark 4>

The image display device according to Additional Remark 1, wherein:

the gate line and charging capacitor line are provided in the same layer.

<Additional Remark 5>

The image display device according to Additional Remark 1, wherein:

the switcher of one subpixel of the pair of subpixels and the switcher of the other subpixel are provided in a point-symmetric manner around the center of the pair of subpixels.

<Additional Remark 6>

The image display device according to Additional Remark 5, wherein:

the operation parts of the switcher of the pair of subpixels are provided along the first direction.

<Additional Remark 7>

The image display device according to Additional Remark 6, wherein:

the data line is inclined in a direction different from the first direction in a layer above the switcher.

<Additional Remark 8>

The image display device according to Additional Remark 1, wherein:

the display element further comprises a black matrix covering a part of the gate line or charging capacitor line.

<Additional Remark 9>

The image display device according to Additional Remark 1, wherein:

an aperture enclosed by the data lines and gate lines is nearly trapezoidal; and the switcher is provided at the upper bottom of the aperture.

<Additional Remark 10>

The image display device according to Additional Remark 1, wherein:

the charging capacitor line is provided in the manner that one charging capacitor line is provided in the subpixel and provided along one of the two gate lines provided at either end of the subpixel.

<Additional Remark 11>

The image display device according to Additional Remark 1, wherein:

the charging capacitor line is provided in the manner that two charging capacitor lines are provided in the subpixel and provided along both of the two gate lines provided at either end of the subpixel.

<Additional Remark 12>

The image display device according to Additional Remark 11, wherein:

the subpixels constituting the pair of subpixels are provided in a point-symmetric manner around the center of the pair of subpixels.

<Additional Remark 13>

The image display device according to Additional Remark 12, wherein:

the black matrix has a line-symmetric shape in the first or second direction.

<Additional Remark 14>

The image display device according to Additional Remark 10, wherein:

assuming that of the optical axes, the optical axis at the center of the unit of display is the first optical axis and the optical axis at the border between the units of displays adjacent in the first direction is the second optical axis, the charging capacitor line is so provided as to cross the second optical axis.

<Additional Remark 15>

A method of driving the image display device according to Additional Remark 1, wherein:

the gate lines are scanned every other line, the polarity of voltage of pixels is inverted on the basis of every other gate line, and the polarity of the display signals transferred is inverted on the basis of every other data line.

<Additional Remark 16>

A terminal device, comprising the image display device according to Additional Remark 1.

<Additional Remark 17>

The terminal device according to Additional Remark 16, wherein:

the terminal device is one of the following: a cellular phone, personal information terminal, personal television, game machine, digital camera, video camera, video player, note-type personal computer, cash dispenser, and vending machine.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

LEGEND 1 image display device
2 display element
2a TFT substrate
2b opposing substrate
3 lenticular lens
3a cylindrical lens
30 optical axis
31 lens convex part
32 lens trough part
4U unit of display
4S subpixel 4R right-eye pixel
4L left-eye pixel
4P pixel
4PAIR1, 4PAIR2 adjoining pixel pair
4PIX pixel electrode
4TFT pixel thin-film transistor
4CLC pixel capacitor
4CS charging capacitor
4CONT1, 4CONT2 contact hole
4COM opposing electrode
4SI silicon layer
5LC liquid crystal layer
6 display unit
7 driver IC
8 flexible substrate
9 cellular phone
11 polarization plate
15 backlight
16 line presenting the light beam direction
17 line presenting the center of image separation
55L left eye
55R right eye
60 black matrix
G, G1, . . . , G7 gate line
D, D1, . . . , D13 data line
CS charging capacitor line
CS2 charging capacitor electrode
RED red filter
GREEN green filter
BLUE blue filter
SP spot diameter
1011 vertical direction (the longitudinal direction of a cylindrical lends)
1012 horizontal direction (the arrangement direction of a cylindrical lends)
1003a cylindrical lens
1041 first view point pixel
1042 second view point pixel
1070 wiring
1075 aperture
1076 light blocking portion

What is claimed is:

1. An image display device, comprising:
a display element comprising subpixels and on which multiple units of display including at least one of the subpixels displaying a first view point image and another one of the subpixels displaying a second view point image are arranged in a matrix; and
an optical distributer configured to distribute light emitted from said first view point subpixel and second view point subpixel in a first direction, the optical distributer having an optical axis parallel to a second direction orthogonal to said first direction,
wherein said subpixels each comprise a switcher configured to display signals to display images, and a charging capacitor electrode forming capacitance,
said display element comprises data lines extended in said first direction and supplying said display signals, gate lines extended in said second direction and controlling said switcher, and charging capacitor lines extended in said second direction and electrically connecting said charging capacitor electrodes to one another in said second direction,
said switcher of one of a pair of subpixels facing each other via one of said data lines is connected to said data line and one of the gate lines,
said switcher of the other of the pair of subpixels is connected to said same data line as said one of the pair of subpixels and a different one of said gate lines from said one of the pair of subpixels,
said charging capacitor electrode and an electrode of said switcher of each subpixel of said pair of subpixels are electrically equally connected,
at least one portion of said gate lines is inclined to cross said optical axis in a direction different from said second direction, and
at least one portion of said charging capacitor lines is provided along said gate lines.

2. The image display device according to claim 1, wherein:
said charging capacitor electrode of one subpixel of said pair of subpixels and said charging capacitor electrode of the other subpixel are integrally formed, and
said data line is inclined in a direction different from said first direction at the part where said charging capacitor electrode or charging capacitor line crosses said data line in a plan view.

3. The image display device according to claim 1, wherein: said pair of subpixels adjacent to each other in said first direction are connected to different ones of said data lines.

4. The image display device according to claim 1, wherein: the gate lines and the charging capacitor lines are provided in the same layer.

5. The image display device according to claim 1, wherein: said switcher of one subpixel of said pair of subpixels and said switcher of the other subpixel are provided in a point-symmetric manner around the center of said pair of subpixels.

6. The image display device according to claim 5, wherein: operation parts of said switcher of said pair of subpixels are provided along said first direction.

7. The image display device according to claim 6, wherein: at least one of the data lines is inclined in a direction different from said first direction in a layer above said switcher.

8. The image display device according to claim 1, wherein: said display element further comprises a black matrix covering a part of said gate lines or the charging capacitor lines.

9. The image display device according to claim 1, wherein:
an aperture enclosed by said data lines and gate lines is nearly trapezoidal, and
said switcher is provided at an upper bottom of said aperture.

10. The image display device according to claim 1, wherein: one of the charging capacitor lines is provided in said subpixel and provided along one of two gate lines provided at either end of said subpixel.

11. The image display device according to claim 1, wherein: two charging capacitor lines are provided in said subpixel and provided along both of the two gate lines provided at either end of said subpixel.

12. The image display device according to claim 11, wherein: said subpixels constituting said pair of subpixels are provided in a point-symmetric manner around the center of said pair of subpixels.

13. The image display device according to claim 12, wherein: said black matrix has a line-symmetric shape in said first or second direction.

14. The image display device according to claim 10, wherein: the optical axis at the center of said unit of display is the first optical axis and said optical axis at the border between said units of displays adjacent in said first direction is the second optical axis, and
said charging capacitor line is provided so as to cross said second optical axis.

15. A method of driving the image display device according to claim 1, wherein:
   scanning every other line of said gate lines;
   inverting the polarity of voltage of pixels is on the basis of every other gate line; and
   inverting the polarity of said transferred display signals on the basis of every other data line.

16. A terminal device, comprising:
   the image display device according to claim 1.

17. The terminal device according to claim 16, wherein: said terminal device is one of the following: a cellular phone, personal information terminal, personal television, game machine, digital camera, video camera, video player, note-type personal computer, cash dispenser, and vending machine.

* * * * *